United States Patent
Machida et al.

(10) Patent No.: US 7,689,618 B2
(45) Date of Patent: Mar. 30, 2010

(54) INFORMATION OUTPUT METHOD, CENTRAL INFORMATION PROCESSING DEVICE, AND INFORMATION OUTPUT PROGRAM

(75) Inventors: Haruo Machida, Kanagawa (JP); Takahiro Shimizu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 713 days.

(21) Appl. No.: 10/953,377

(22) Filed: Sep. 29, 2004

(65) Prior Publication Data

US 2005/0076159 A1 Apr. 7, 2005

(30) Foreign Application Priority Data

Oct. 1, 2003 (JP) ............................. 2003-343874

(51) Int. Cl.
G06F 17/30 (2006.01)

(52) U.S. Cl. ........................ 707/740; 707/769; 710/1; 715/209

(58) Field of Classification Search ................. 715/209; 707/3, 10, 101, 102; 710/1
See application file for complete search history.

(56) References Cited

U.S. PATENT DOCUMENTS

| | | | | |
|---|---|---|---|---|
| 6,591,263 | B1 * | 7/2003 | Becker et al. ................... | 707/3 |
| 7,136,821 | B1 * | 11/2006 | Kohavi et al. ................... | 705/5 |
| 2001/0005835 | A1 * | 6/2001 | Kodama et al. ............... | 705/27 |
| 2001/0037250 | A1 * | 11/2001 | Lefkowitz ..................... | 705/26 |
| 2001/0048802 | A1 * | 12/2001 | Nakajima et al. ............. | 386/46 |
| 2002/0120460 | A1 * | 8/2002 | Haraguchi ...................... | 705/1 |
| 2003/0036930 | A1 * | 2/2003 | Matos et al. ................... | 705/5 |
| 2003/0158786 | A1 * | 8/2003 | Yaron et al. ................... | 705/26 |
| 2004/0006542 | A1 * | 1/2004 | Gilliam et al. ................ | 705/51 |

FOREIGN PATENT DOCUMENTS

JP 2003-030287 A 1/2003
JP 2003-030287 A 1/2003

* cited by examiner

Primary Examiner—Hosain T Alam
Assistant Examiner—Jieying Tang
(74) Attorney, Agent, or Firm—Canon U.S.A. Inc., I.P. Division

(57) ABSTRACT

A PC server, connected with a client PC, extracts from a database content satisfying a condition designated from the client PC, and content that does not directly satisfy the designated condition. A pamphlet including the extracted content is output.

34 Claims, 28 Drawing Sheets

REPRESENTATIVE
PAGE 1

REPRESENTATIVE
PAGE 2

THUMBNAIL OF
REPRESENTATIVE
PAGE

FIG. 20

| NUMBER N OF CATALOG INFORMATION | | | | |
|---|---|---|---|---|
| CATALOG FILE NAME 1 | CATALOG INFORMATION 1 | ON | ON | OFF |
| CATALOG FILE NAME 2 | CATALOG INFORMATION 2 | ON | ON | OFF |
| CATALOG FILE NAME 3 | CATALOG INFORMATION 3 | ON | ON | OFF |
| ..... | ..... | ..... | ..... | ..... |
| CATALOG FILE NAME N-1 | CATALOG INFORMATION N-1 | ON | ON | OFF |
| CATALOG FILE NAME N | CATALOG INFORMATION N | ON | ON | OFF |

FIG. 21

| NUMBER M OF TOUR-PRODUCT INFORMATION | |
|---|---|
| TOUR-PRODUCT NAME 1 | TOUR-PRODUCT INFORMATION 1 |
| TOUR-PRODUCT NAME 2 | TOUR-PRODUCT INFORMATION 2 |
| TOUR-PRODUCT NAME 3 | TOUR-PRODUCT INFORMATION 3 |
| ⋮ | ⋮ |
| TOUR-PRODUCT NAME M-1 | TOUR-PRODUCT INFORMATION M-1 |
| TOUR-PRODUCT NAME M | TOUR-PRODUCT INFORMATION M |

FIG. 22

| NUMBER L OF CORRELATION | | | |
|---|---|---|---|
| CATALOG FILE NAME 1 | PAGE 1 | TOUR-PRODUCT NAME 1 | DISCLOSED |
| CATALOG FILE NAME 1 | PAGE 1 | TOUR-PRODUCT NAME 2 | DISCLOSED |
| CATALOG FILE NAME 1 | PAGE 2 | TOUR-PRODUCT NAME 3 | DISCLOSED |
| CATALOG FILE NAME 1 | PAGE 2 | TOUR-PRODUCT NAME 4 | DISCLOSED |
| CATALOG FILE NAME 2 | PAGE 1 | TOUR-PRODUCT NAME 5 | DISCLOSED |
| CATALOG FILE NAME 2 | PAGE 2 | TOUR-PRODUCT NAME 6 | DISCLOSED |
| CATALOG FILE NAME 2 | PAGE 2 | TOUR-PRODUCT NAME 7 | |
| ...... | | | |
| CATALOG FILE NAME N | PAGE 1 | TOUR-PRODUCT NAME M-1 | DISCLOSED |
| CATALOG FILE NAME N | PAGE 2 | TOUR-PRODUCT NAME M-1 | DISCLOSED |
| CATALOG FILE NAME N | PAGE 2 | TOUR-PRODUCT NAME M | DISCLOSED |

INFORMATION OUTPUT METHOD, CENTRAL INFORMATION PROCESSING DEVICE, AND INFORMATION OUTPUT PROGRAM

CROSS REFERENCE TO RELATED APPLICATIONS

This application claims priority from Japanese Patent Application No. 2003-343874 filed Oct. 1, 2003, which is hereby incorporated by reference herein.

BACKGROUND OF THE INVENTION

1. Field of the Invention

The present invention relates to an information output method, a central information processing device, and an information output program.

2. Description of the Related Art

A system in which a user obtains desired information by means of a document such as a pamphlet, an information providing system comprising a user-side information processing device such as a personal computer (PC) and the like, and a central information processing device such as a server and the like, is known. In such a system, upon the user inputting a keyword relating to his/her desired information to the user-side information processing device, the central information processing device transmits a document including the input keyword to the user-side information processing device.

Examples of such a known information providing system include a system in which tour-contents information, such as information relating to tourist spots, in which attribute information, such as the name of a nation, the name of a city, a guide classification (kind of a tourist spot), and the like is appended, is registered in a database of the main server in a form enabling web-browsing system, and a user serving as a travel consultant offers a customer the tour-contents information narrowed down by a search based on the attribute information selected by the user as printed matter through the terminal of a branch and the like as well as the attribute information such that the user can smoothly select a tour suitable for the customer, can easily explain the selected tour-content to the customer, and can easily customize the tour-content in accordance with the customer needs (for example, see Japanese Patent Laid-Open No. 2003-030287).

With this system, a tour planning department registers images of a tourist point, a guide classification, the purpose of a tourist point, and attractions of a tourist point in the database by operating a tour-support application of the main server at the time of registering contents.

However, the above-described system leads to a problem in that the user cannot obtain desired documents because other documents that do not satisfy the conditions input by the user are not transmitted to the user-side information processing device. For example, other documents may not directly satisfy the conditions input by the user, but may be relevant to a document satisfying the input conditions, and therefore should be presented even though the input conditions are not directly satisfied by the document.

In order to solve the above-described problem, the number of conditions input by the user can be increased in order to provide related documents that do not directly satisfy the input conditions. However, this leads to a problem of poor ease-of-use for the user.

SUMMARY OF THE INVENTION

The present invention has been made to solve the above conventional problems, and accordingly, provides an information output method, a central information processing device, and an information output program wherein a user can obtain desired information without deteriorating ease-of-use.

According to one aspect of the present invention, an information processing device communicates with a central information processing device having a database and outputs a pamphlet including a plurality of contents. The information processing device comprises: an input device configured to input a specification condition for specifying content; a receiver configured to receive, from the central information processing device, a pamphlet including information extracted from the database by the central information processing device as a first content satisfying the specification condition and as a second content not directly satisfying the specification condition; and an output device configured to output the pamphlet received from the receiver.

The pamphlet may be a tour pamphlet containing a plurality of tour information contents.

Other features and advantages of the present invention will be apparent from the following description taken in conjunction with the accompanying drawings, in which like reference characters designate the same or similar parts throughout the figures thereof unless otherwise noted.

BRIEF DESCRIPTION OF THE DRAWINGS

FIG. 10A shows the general configuration of a catalog registration screen, and FIG. 10B shows an example of catalog data to be registered with the catalog registration screen.

FIG. 20 shows an example of a catalog information setting file for setting catalog information in block on selected catalog data.

FIG. 21 shows an example of a tour-product information setting file for setting tour-product information in block.

FIG. 22 shows an example of a correlation setting file for setting tour-product information in block on each page data of catalog data.

FIG. 27 shows an example of a tour-product information file output screen for outputting a file such as tour-product information selected and the like.

DESCRIPTION OF THE PREFERRED EMBODIMENTS

An exemplary embodiment of the present invention is described in detail next with reference to the drawings. It should be noted that the relative arrangement of the components, the numerical expressions and numerical values set forth herein do not limit the scope of the present invention unless specifically stated otherwise.

Description will be made regarding an information output method, a central information processing device, and an information output program according to an embodiment of the present invention with reference to the drawings.

Figure 1:
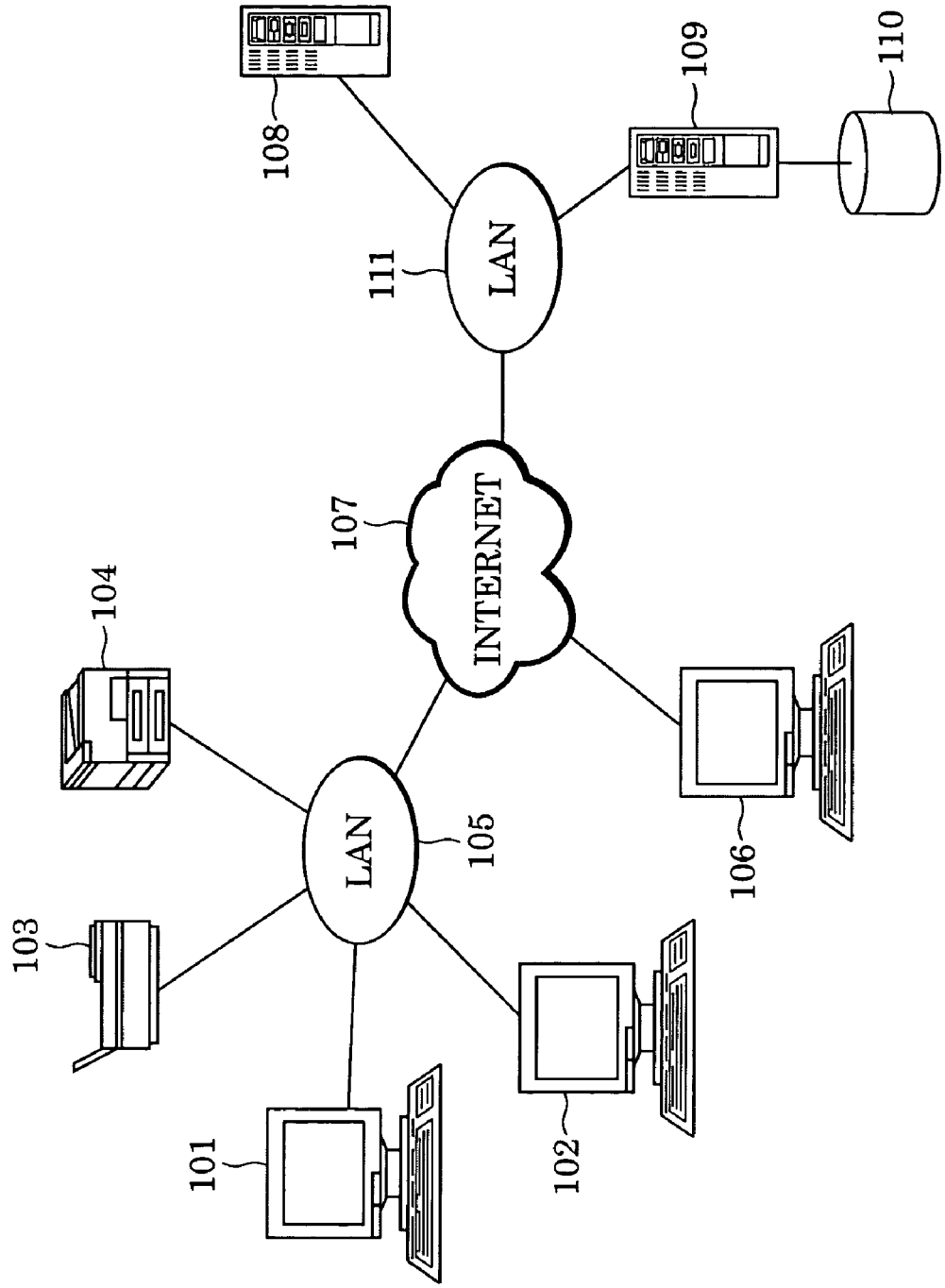
FIG. 1 is a diagram illustrating the general configuration of an information output system made up of an information output device and a central information processing device according to an embodiment of the present invention.

FIG. 1 is a diagram illustrating the general configuration of an information output system made up of an information output device and a central information processing device according to the exemplary embodiment of the present invention.

The information output system shown in FIG. 1 includes client PCs (information processing devices) 101 and 102. A system controller registers a new data file using the client PCs, performs system maintenance such as correction of user management information and the like, or instructs search of tour-products, such as tour courses and the like, or output of a tour pamphlet and the like.

A scanner 103 is used for reading image data shared by device connected to a local area network (LAN) 105 (described later) which reads catalog image data and the like in accordance with instructions from the client PC 101 or the like. A printer 104 is shared by devices connected to the LAN 105, and outputs catalogs, tour pamphlets, and the like in accordance with instructions from the client PC 101.

A device connected to the LAN 105 exchanges data with another device via the LAN 105. A client PC 106 is directly connected to the Internet 107. Though the client PC 106 is connected to a different network than the network on which the client PC 101 or the like are connected to, the client PC 106 is used for the same purpose as that of the client PC 101.

A hypertext transfer protocol (HTTP) server 108 receives a request transmitted in the HTTP protocol from the client PC 101 or the like via a LAN 105 or 111, or the Internet 107. The later-described various screens can be displayed on a display unit of the client PC 101 owing to the processing performed by the HTTP server 108.

Web application servers (central information processing devices) 109 are connected to the HTTP server 108 via the LAN 111. The HTTP server 108 distributes a job to the appropriate web application server 109 according to a request transmitted from the client PC 101 or the like. The HTTP server 108 sends the processing results of a job back to the client PC 101 or the like.

A database 110, which is connected to the web application server 109, or is built in the web application server 109, stores the later-described catalog data and image data, text information of tour-product information and catalog information, group information, processing information of a data file, and the like. Thus, the HTTP server 108, the web application server 109, and the database 110 are organically combined with each other so as to function as a web database system.

While the above description has been made with reference to an example wherein the web application server 109, the HTTP server 108, and the database 110 are physically separate devices, the present invention is not restricted to this arrangement, rather, an arrangement may be made wherein the functions included in the web application server 109, the HTTP server 108, and the database 110 are physically provided in one device. Also, an arrangement may be made wherein the same functions as those of the web application server 109, the HTTP server 108, and the database 110 are performed by another server. With the following description, the HTTP server 108 and the web application server 109 are generically referred to as PC servers, or servers.

Figure 2:
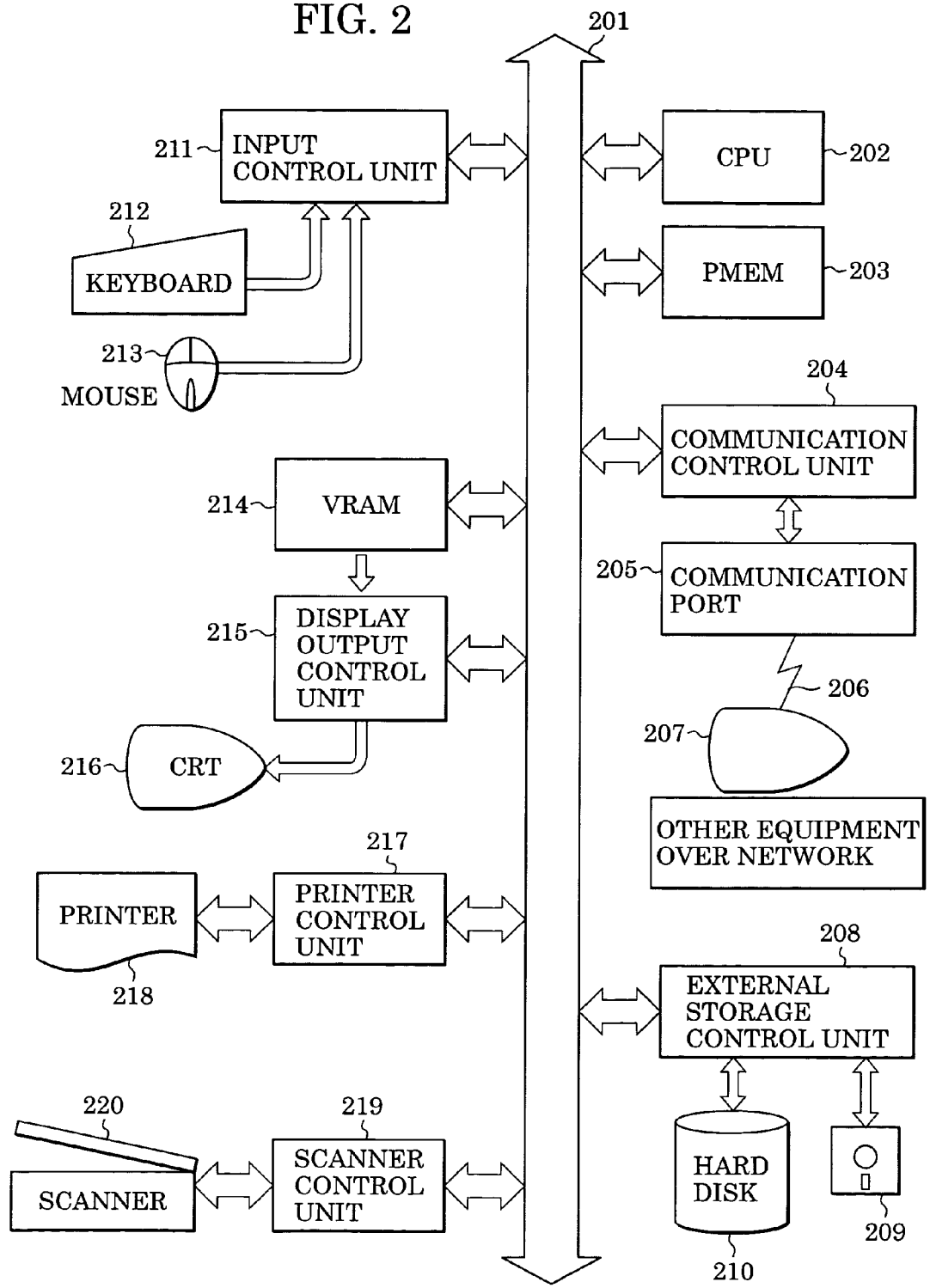
FIG. 2 is a block diagram illustrating the configuration of a client PC or a PC server in FIG. 1.

FIG. 2 is a block diagram illustrating the configuration of the client PC 101 or the PC server in FIG. 1. Each configuration block (described later) is connected to a system bus 201. A central processing unit (CPU) 202 selects or reads out a program for realizing an information output method according to the present invention from a hard disk 210 as appropriate, and executes this program.

Data input from a keyboard 12 is stored into the program memory 203 (hereinafter, referred to as PMEM) serving as text memory as code information. A communication control unit 204 controls input/output data in a communication port 205. The signal output from the communication port 205 is transmitted to a communication port of another device 207 over a network, such as the LAN 105 or the like, via a communication line 206. The communication as to a printer or a scanner shared via the network is performed via communication control unit 204.

With the present embodiment, while description is made regarding an example of using a network such as a LAN, the communication port and the communication line connected to the communication control unit 204 may be a general public line.

An external storage device control unit 208, 209 and 210 denote storage devices for storage of data files. For example, the data files may be stored on a floppy disk 209 (hereinafter, referred to as FD), and/or a hard disk 210 (hereinafter, referred to as HD). An input control unit 211 is connected with the keyboard 212, the mouse 213 and the like. An operator performs operational instructions and the like for an information processing system by operating the keyboard 212 or the like, for example.

A pointing device 213 (hereinafter, referred to as PD), such as a mouse, for instructing processing of image data on a display device 216, such as a cathode ray tube (CRT) is employed with the present embodiment. With this pointing device 213, the operator can perform instructions for an object to be edited, instructions for a drawing position, and the like, as well as instructions for processing by moving a cursor on the display 216 in arbitrary X and Y directions so as to select a command icon on a command menu.

Data displayed on the display device 216 is laid out on video image memory 214 (hereinafter, referred to as VRAM) as bitmap data and is read from the VRAM 214 and provided to the display device 216 via a display output control unit 215.

A printer control unit 217 performs output control of data as to a printer 218 connected thereto. A scanner control unit 219 controls a scanner 220 connected thereto.

With the PC server, the scanner control unit 219 and scanner 220 are mandatory. However, with the client PC 101 or the like, the scanner control unit 219 and scanner 220 of the PC server can be used via the above-described communication control unit 204 and communication port 205. The PC server and client PC 101 can use the scanner control unit 219 and scanner 220 of another PC, or a scanner 103 via the above-described communication control unit 204 and communication port 205. Note that the scanner 103 and the scanner 220 may be physically separate components, or may be one component made up of the scanner 103 including the scanner 220.

Figure 3:
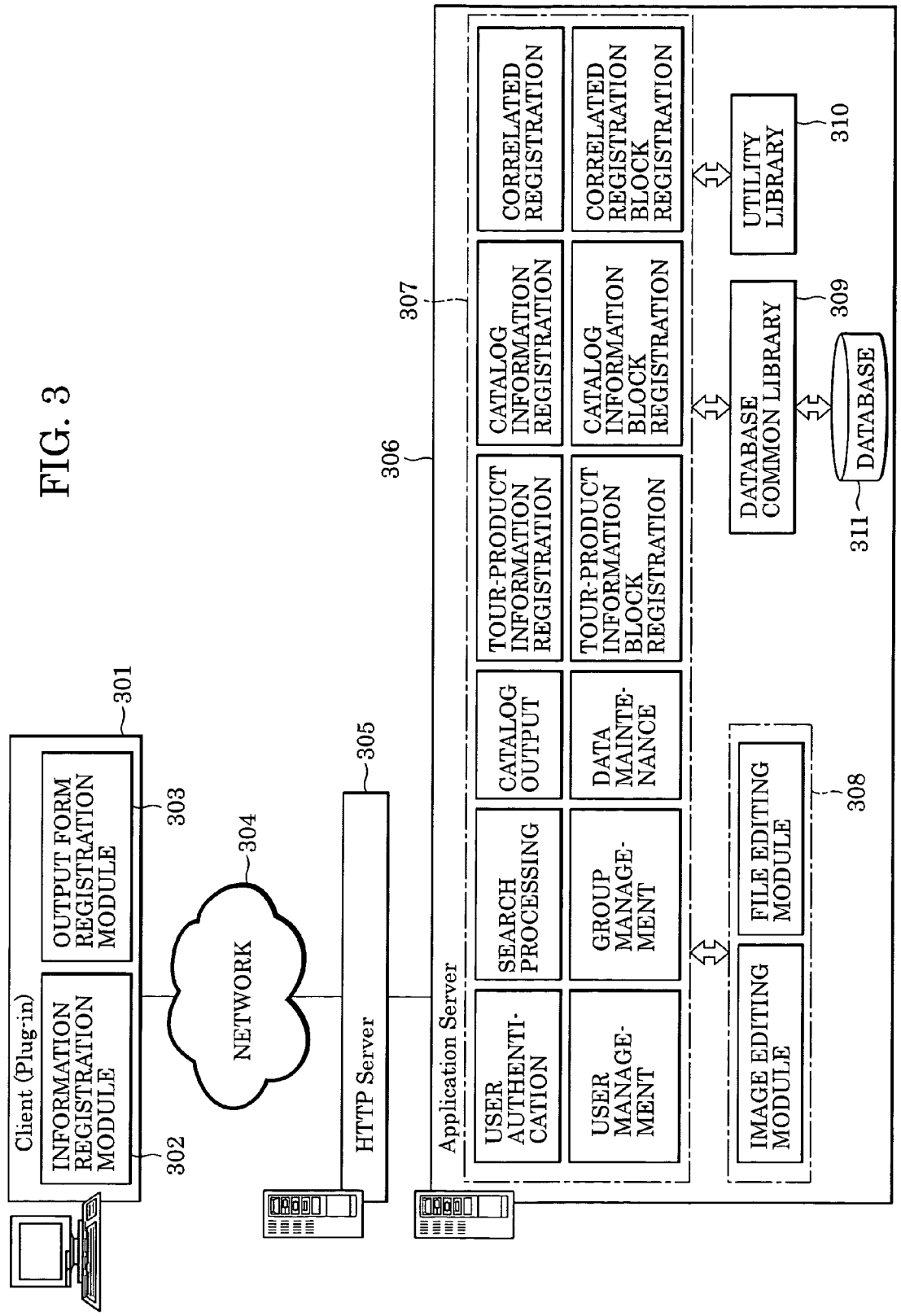
FIG. 3 is a block diagram illustrating the module configuration of the system in FIG. 1.

FIG. 3 is a block diagram illustrating the module configuration of the system in FIG. 1. A client PC 301 (client PCs 101, 102, and 106 in FIG. 1) stores an information registration module 302 for registering a data file, such as catalog information, image data, and the like in a web application server 306 (which corresponds to web application server 109 in FIG. 1), and an output form registration module 303 for registering a form to output tour-product information. However, since these modules are automatically distributed in the form of a plug-in for a web browser or the like from the web application server 306 as necessary, there is no need to perform install processing and the like for these modules. Data is exchanged over a network 304 via an HTTP server 305, which is equivalent to the HTTP server 108 in FIG. 1.

The web application server 306 stores a processing module 307 for processing requests from the client PC 301 via the HTTP server 305. Examples of executable functions include user authentication, search processing, block registration of various data, output of tour-product information, data maintenance, and the like. These modules are loaded into the memory according to a request from the client PC 301, and processing is executed. Separately from these modules, the web application server 306 stores a file editing module 308 including an image editing module for performing image-editing such as for PDF (Portable Document Format) files, bitmap files, and the like, and a file editing module for performing editing such as binding of data files, splitting of data files, and the like. Registration of a tour pamphlet on the PC server can be performed for every page by splitting a PDF file in order to realize a customized catalog in detail in increments of pages based on the user's search conditions, such as those shown in FIG. 24 and described later. Furthermore, the web application server 306 stores a library 309 for exchanging data with a database 311, and a utility library 310 which may include various utilities.

Figure 4:
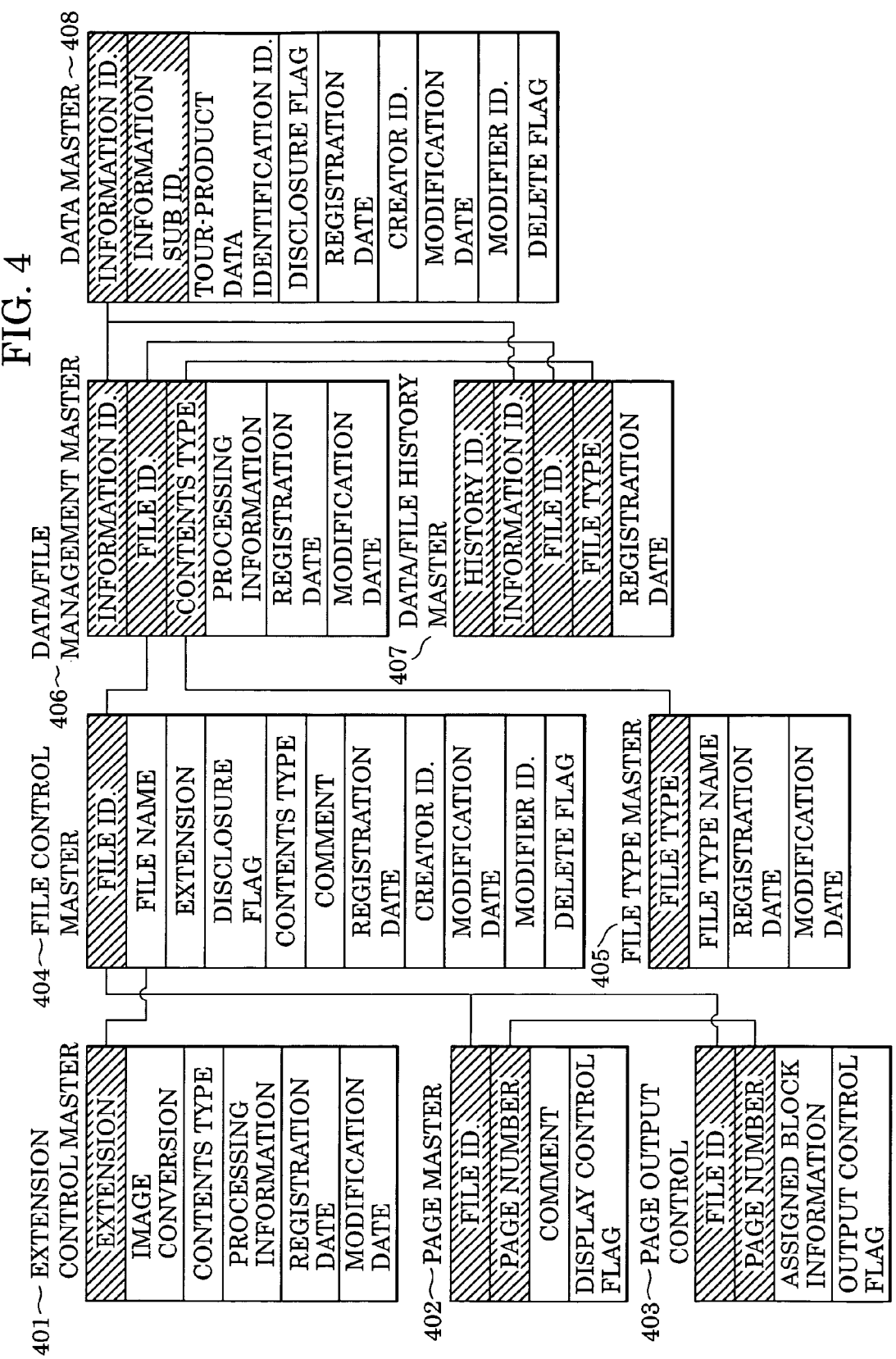
FIG. 4 is a diagram illustrating an example of tables included in the database in FIG. 1 or FIG. 3.
Figure 5:
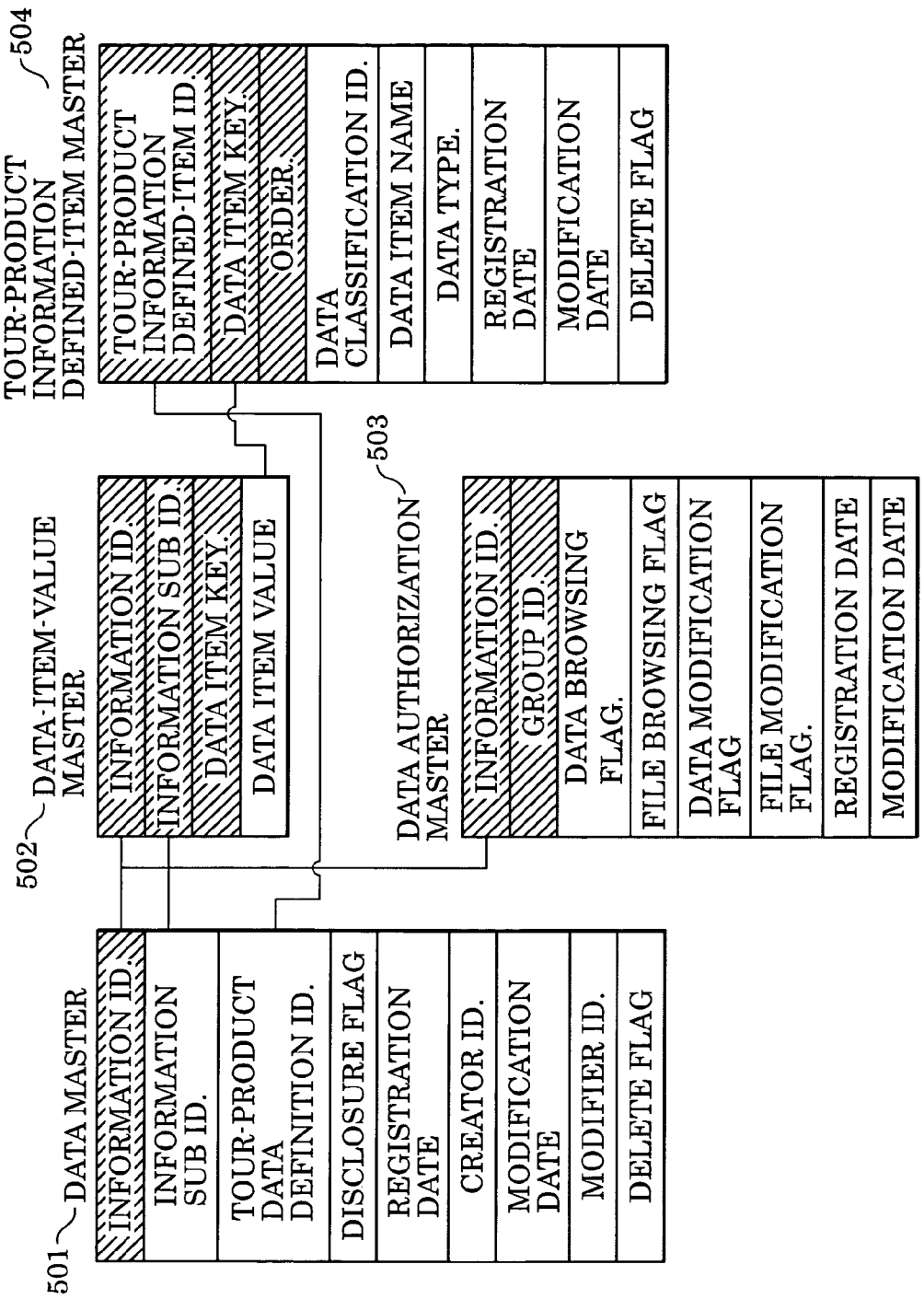
FIG. 5 is a diagram illustrating an example of tables included in the database in FIG. 1 or FIG. 3.

FIGS. 4 and 5 are diagrams illustrating an example of tables included in the database 110, 311 (in FIG. 1 or FIG. 3, respectively). The content of information in FIGS. 4 and 5 is based on registration instructions via setting screens shown in FIGS. 10, 12, 13, 14, 15, 16, and 17 and described later.

First, description will be made regarding FIG. 4. In FIG. 4, a data master table 408 manages text information of tour-product information, catalog information, and the like. Examples of stored information include a unique information ID, a registration date, a modification date, a disclosure flag indicating whether or not information managed is disclosed on the web, a delete flag indicating whether or not information managed is deleted, and the like.

A file management master table 404 manages information, such as catalog data files, image data files, and the like. Examples of stored information include an information ID that is determined uniquely, registration date, modification date, a disclosure flag indicating whether or not information managed is disclosed on the web, a delete flag indicating whether or not information managed is deleted, and the like. The file management master table 404 is correlated with an extension management master table 401, a page master table 402 for managing attribute information for every page regarding a data file made up of multiple pages, and a page output control table 403, all of which are described in further detail below.

The extension management master table 401 stores information such as processing information of processing to be subjected to data files according to contents type information and extension type thereof, and the like. The processing information stores whether or not compression, page split/merge, and the like can be executed according to the extension type of a data file, for example.

The page master table 402 stores attribute information for each page. The attribute information to be stored includes a file ID for every page, page number information, comment information, and a display control flag. Information indicating a representative screen for displaying a screen, and the like is set to the display control flag at the time of thumbnail-displaying catalog information and the like correlated with a search screen and the like.

The page output control table 403 stores information at the time of outputting pages. The information to be stored includes a file ID, page number information, assigned block information, and an output control flag. Information for grouping other pages correlated with this page is set to the assigned block information. For example, in the event that one piece of information is stored from the second page through the fifth page of one catalog data made up of multiple pages, these pages are preferably managed in a group. In such a case, these pages are arranged to be grouped by setting common key data (keyword) to the assigned block information of each page.

The attribute information at the time of outputting a page is set to the output control flag. For example, since the page in the catalog data on which the terms of agreement are included should be included in the tour pamphlet at the time of outputting a tour pamphlet without fail, the output control flag is set with "mandatory" as a printout attribute. In the event that the content described on the page of catalog data is correlated with individual tour-product alone, the output control flag is set with "individual" as a printout attribute. In the event that the content is correlated with other tour-product, the output control flag is set with "common" as a printout attribute.

Though the form of the flag is assumed to be made up of singular or multiple bit information, rather, the form of the flag may be made up of a character string as well.

A data/file management master table 406 is a table for correlating a data file managed by the file management master table 404 with text information managed by a data master table 408. Correlation with data files may be performed in increments of pages.

A file type master table 405 manages file type name information for categorizing data files at the time of correlating a data file with text information. Examples of file type name information include general catalog data, regional catalog data, main image data, and the like. Also, a data/file history master table 407 manages history information between data files and text information.

Next, description will be made regarding FIG. 5 which includes a data master table 501 which is the same as the data master table 408 in FIG. 4. A data item value master table 502 manages data items and the values thereof correlated with the data master. Examples of these items include tour-product information such as a destination, a company hosting the tour, a region, and the like. A tour-product information definition item master table 504 manages form data at the time of displaying the data items correlated with the data master. This table stores information such as the order to display the data items, the data item names to be displayed, and the like. A data authorization master table 503 stores authorization information as to the data master. The types of authorization include data browsing, file browsing, data modification, and file modification. Also, the above-described authorization is set in increments of group ID, such as offices of a travel agent; it may be set for each travel consultant, which is a user.

Figure 6:
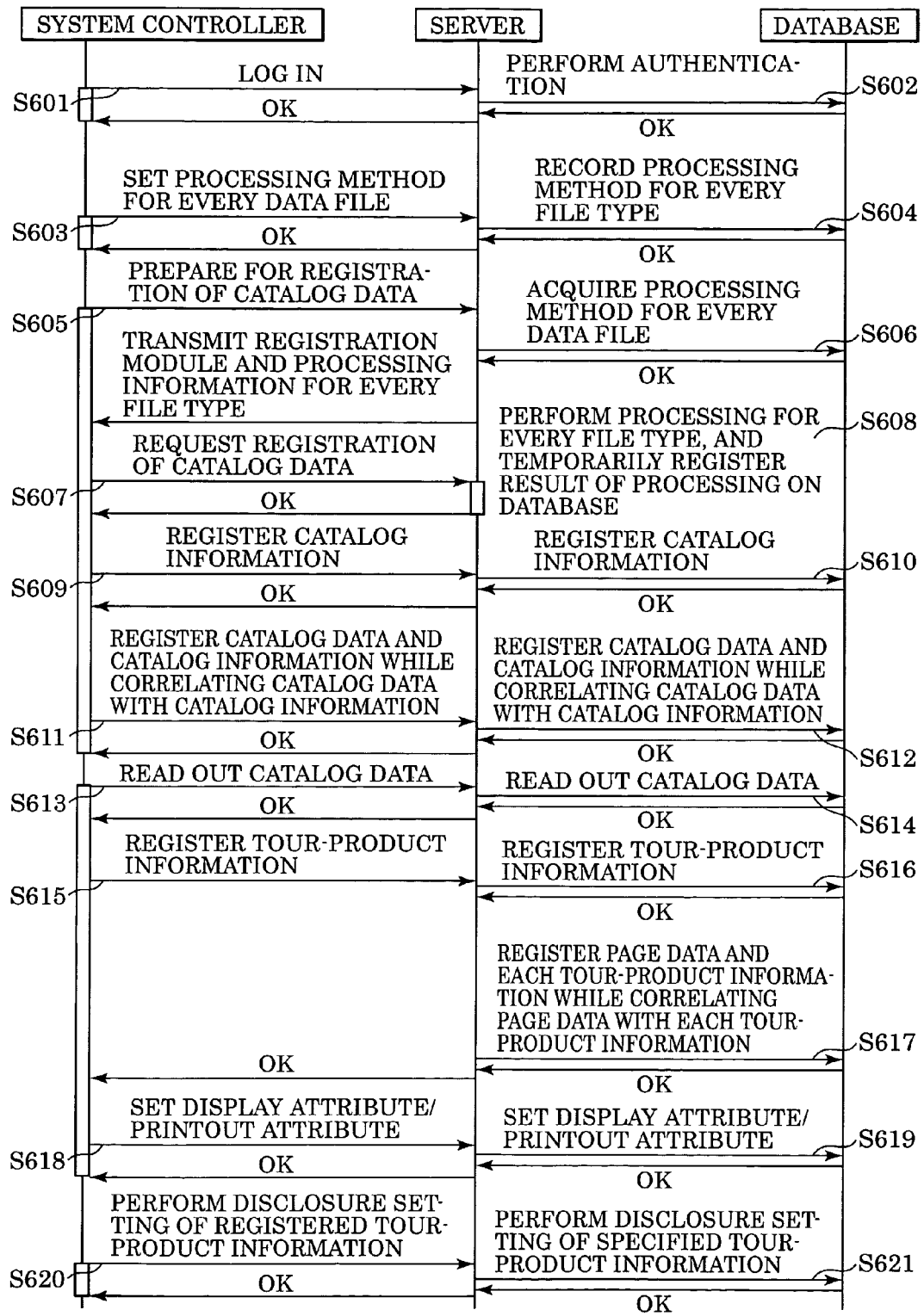
FIG. 6 is a flowchart illustrating catalog data registration processing executed in the information output system in FIG. 1.

Next, description will be made regarding catalog data registration processing executed in the information output system in FIG. 1. FIG. 6 is a flowchart illustrating catalog data registration processing executed in the information output system in FIG. 1. While the server PC and the database 110 are shown separately in FIG. 6, physically the same device (central information processing device) may perform processing executed in the server PC and the database 110. This applies to FIG. 7 as well.

In FIG. 6, first, the system controller attempts to log into the system in FIG. 1 by inputting his/her account and password as to the PC server via the client PC 101 or the like (Step S601). In response to this log-in, the PC server inquires regarding whether or not catalog data registration processing by the input account and password (the later-described group ID and the like) is permitted of the database 110 so as to perform authentication processing (Step S602). Note that the above-described authentication processing may be authentication processing with other authentication information other than accounts and passwords. Here, in the event that catalog data registration processing is not permitted, the PC server transmits an error screen to the client PC 101. In the event that catalog data registration processing is permitted, the flow proceeds to the next step, and also a catalog data registration screen for the system controller is displayed, for example.

Figure 8:
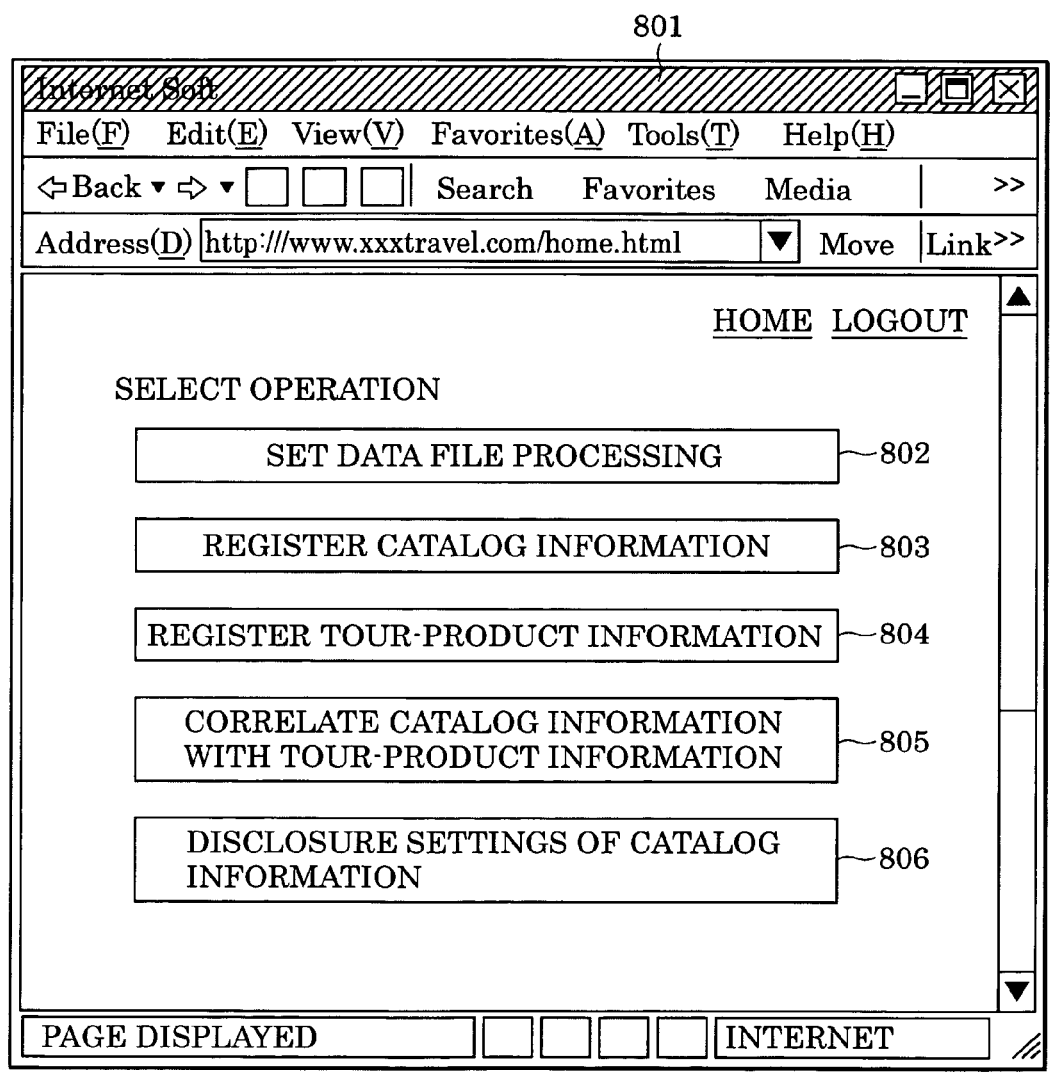
FIG. 8 shows an example of a catalog data registration screen.

FIG. 8 illustrates an example of the catalog data registration screen 801 supplied from the PC server to the client PCs 101, 102, 106, and the like. The catalog data registration screen 801 includes controls, such as buttons, for selecting catalog registration functions as described below. A data file processing setting button is used for setting a data file processing method for every data file type in the PC server at the time of registering a data file in the database 110. A catalog information registration button 803 executes registration processing for selecting catalog data, and registering the catalog information in the PC server. A tour-product information registration button 804 is used for registering tour-product information of tour-products, such as each tour course included in catalog data and the like, in the PC server. A correlation button 805 is used for correlating catalog information registered in the PC server with tour-product information registered in the PC server. A disclosure setting button 806 is used for setting whether or not catalog information registered in the PC server is disclosed over the Internet.

Referring again to FIG. 6, next, the system controller depresses the data file processing setting button 802 so as to display a data file processing setting screen 2501 (shown in FIG. 9 and described later), and sets a data file processing method for every data file at the time of registering a data file in the PC server or the database (Step S603). For example, compression processing and split-of-page processing are set for a PDF file, and compression processing is set for a BMP file. However, this setting is not always mandatory. Here, in the event that a data file processing method is set, the PC server registers the processing method set in the database 110 (Step S604). In the event that an error (such as a setting failure of the setting method) occurs, the processing for transmitting an error screen to the client PC 101 is the same as the authentication processing. In the event that the setting registration is normally completed, the flow proceeds to the next step.

Figure 9:
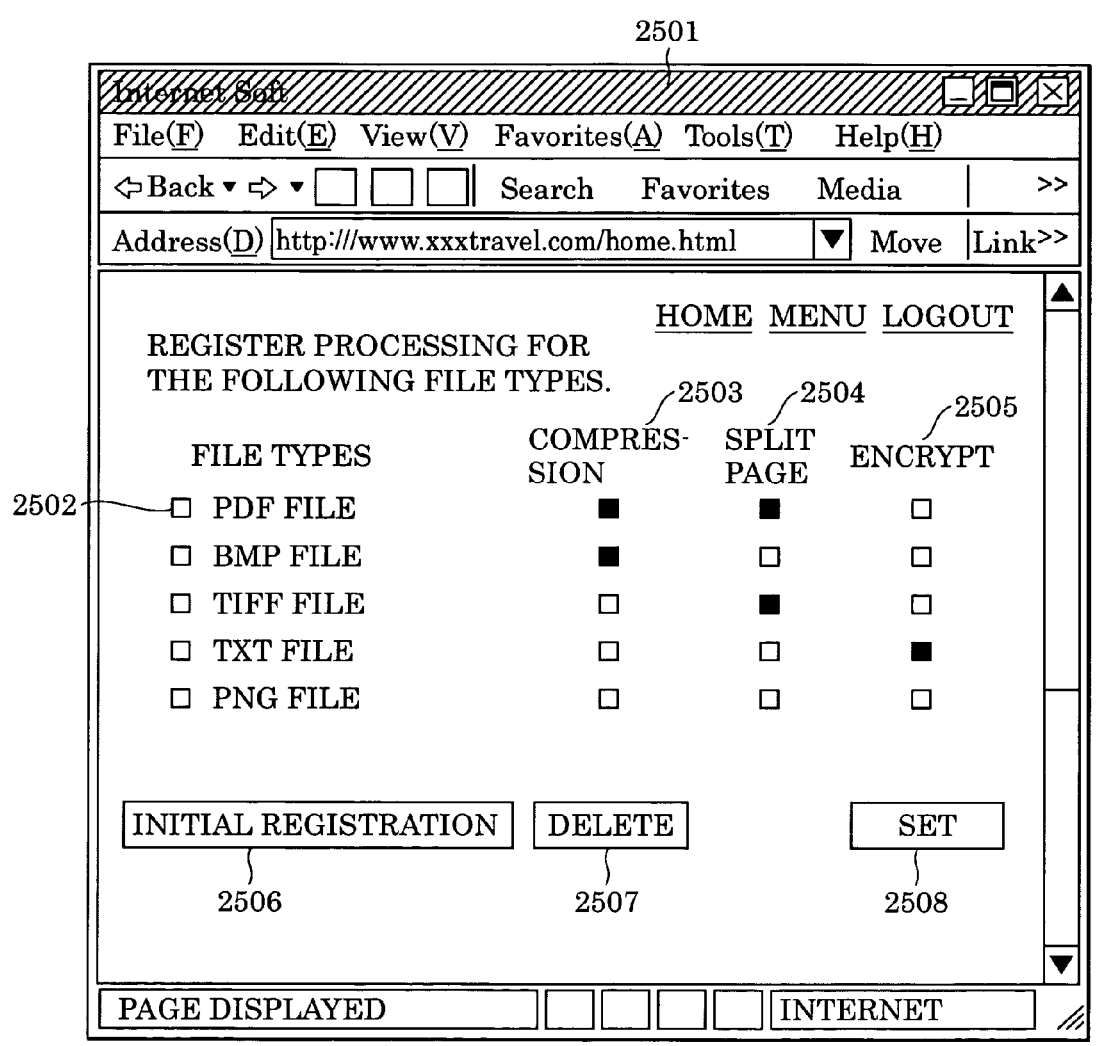
FIG. 9 shows an example of a screen for setting a data file processing method for every type of data file.

FIG. 9 illustrates an example of a screen for setting a data file processing method for every data file in the PC server. The setting screen is supplied from the PC server to the client PC 101, 102, 106, and the like in the same way as FIG. 8. The setting screen in FIG. 9 is used by the system controller of the PC server at the time of setting the PC server, for example. In the event that a PDF file needs to be split, for example because the PC server has low processing capacity, the PC server is set from the client PC via this setting screen in FIG. 9. Also, the setting performed via the setting screen in FIG. 9 is reflected on checkboxes 1903 and 1904, and the like (shown in FIG. 11 and described later).

FIG. 9 shows an exemplary data file processing setting screen 2501 that is displayed as a browser screen and includes a list of data file types 2502 registered in the PC server at the time of displaying the data file processing setting screen 2501.

A function list of processing methods registered in the PC server 2503, 2504, and 2505 is displayed on the data file processing setting screen 2501. In this example, a compression function 2503, a split-of-page function 2504, and an encryption function 2505 are registered.

Here, for example, in the event that the compression function needs to be set as the processing method of a certain type data file, the system controller selects the checkbox of the compression function on the line of the corresponding data file type in the list of data file types 2502. In this example, the compression function 2503 and the split-of-page function 2504 are selected as the processing method of a PDF file.

In the event that a new data file type is registered in the PC server, the system controller selects an initial registration button 2506. Selecting this button enables the new data file type to be input and added to the list of data file types 25023 displayed on the data file processing setting screen 2501, thus setting a processing method as to the new data file type.

In the event of deleting a data file type, the system controller selects the checkbox at the head (beginning, left-hand side) of the line of the data file type to be deleted, and then selects a delete button 2507. In the event that all the settings are completed and ready to execute, the system controller selects a set button 2508.

Next, the system controller depresses the catalog information registration button 803 (of FIG. 8) so as to prepare for registration of catalog data (Step S605 of FIG. 6). Upon the catalog information registration button 803 being depressed, the PC server reads out the processing method for every data file type (Step S606), and transmits the processing method to the client PC 101 as well as a file registration module for registering data files. Here, in the event that the file registration module already exists in the client PC 101, the module is not transmitted. The file registration module displays a catalog registration screen 901 (shown in FIG. 10A and described later) as the browser screen of the client PC 101.

Next, in Step S607, the system controller selects the catalog data to be registered with the catalog registration screen 901 (FIG. 10A) so as to perform the registration request of catalog data as to the PC server.

Figure 10A:
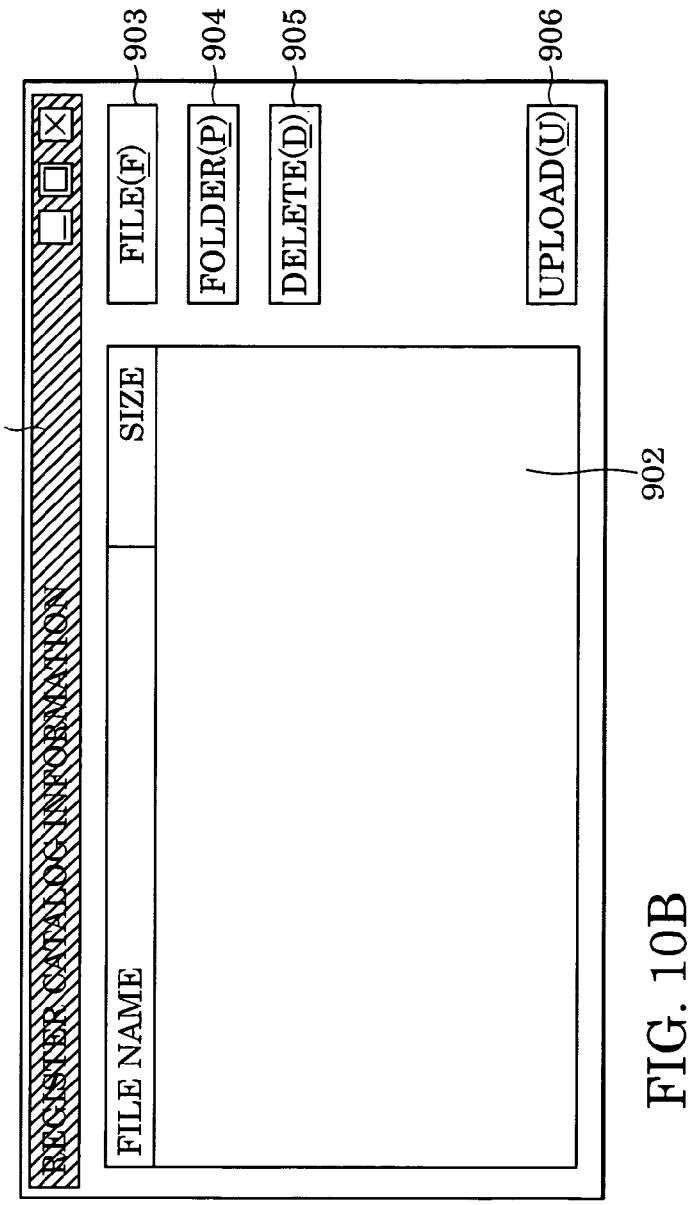
FIGS. 10A and 10B illustrate an example of a catalog registration screen for performing a registration request of catalog data.
Figure 10B:
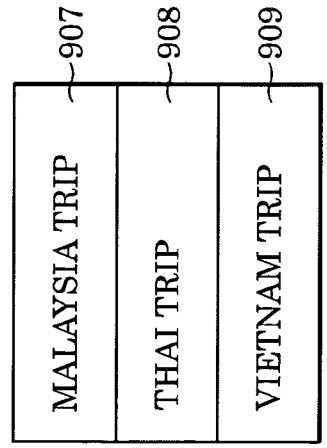

FIGS. 10A and 10B are an example of the catalog registration screen for performing the registration request of catalog data. FIG. 10A is a diagram illustrating the general configuration of the catalog registration screen 901, and FIG. 10B is a diagram illustrating an example of catalog data to be registered with the catalog registration screen 901. The contents of FIG. 10A are also supplied from the PC server to the client PC 101, 102, 106, and the like, in the same way as FIG. 8, and are offered according to the instructions as to the input unit of catalog information registration button 803 in FIG. 8 as previously described.

In FIG. 10A, the catalog registration screen 901 includes a catalog data list display screen 902 on which a catalog data list to be registered in the PC server is displayed. A file button 903 is provided for displaying a file reference screen for selecting a file serving as catalog data to be registered. Upon the file button 903 being selected, the file reference screen is displayed, and upon a file being selected on the screen, the selected file is displayed on the catalog data list display screen 902 as catalog data. Upon a folder button 904 being selected, the screen for referring to a folder is displayed, and upon a folder being selected on the screen, all of the files included in the selected folder are displayed on the catalog data list display screen 902 as catalog data.

The catalog data can be deleted by selecting the catalog data to be deleted from the catalog data list display screen 902, and then selecting a delete button 905. All the catalog data displayed on the catalog data list display screen 902 in the PC server can be registered by selecting an upload button 906. Upon the upload button 906 being selected, a registration confirmation screen 1901 (shown in FIG. 11 and described later) is displayed.

In FIG. 10B, catalog data is made up of tour-products, for example the tour-products shown in FIG. 10B include: "Malaysia trip" 907, "Thai trip" 908 and "Vietnam trip" 909. Here, each tour-product is document data made up of a plurality of page data, and accordingly, the catalog data is also document data made up of a plurality of page data.

Figure 11:
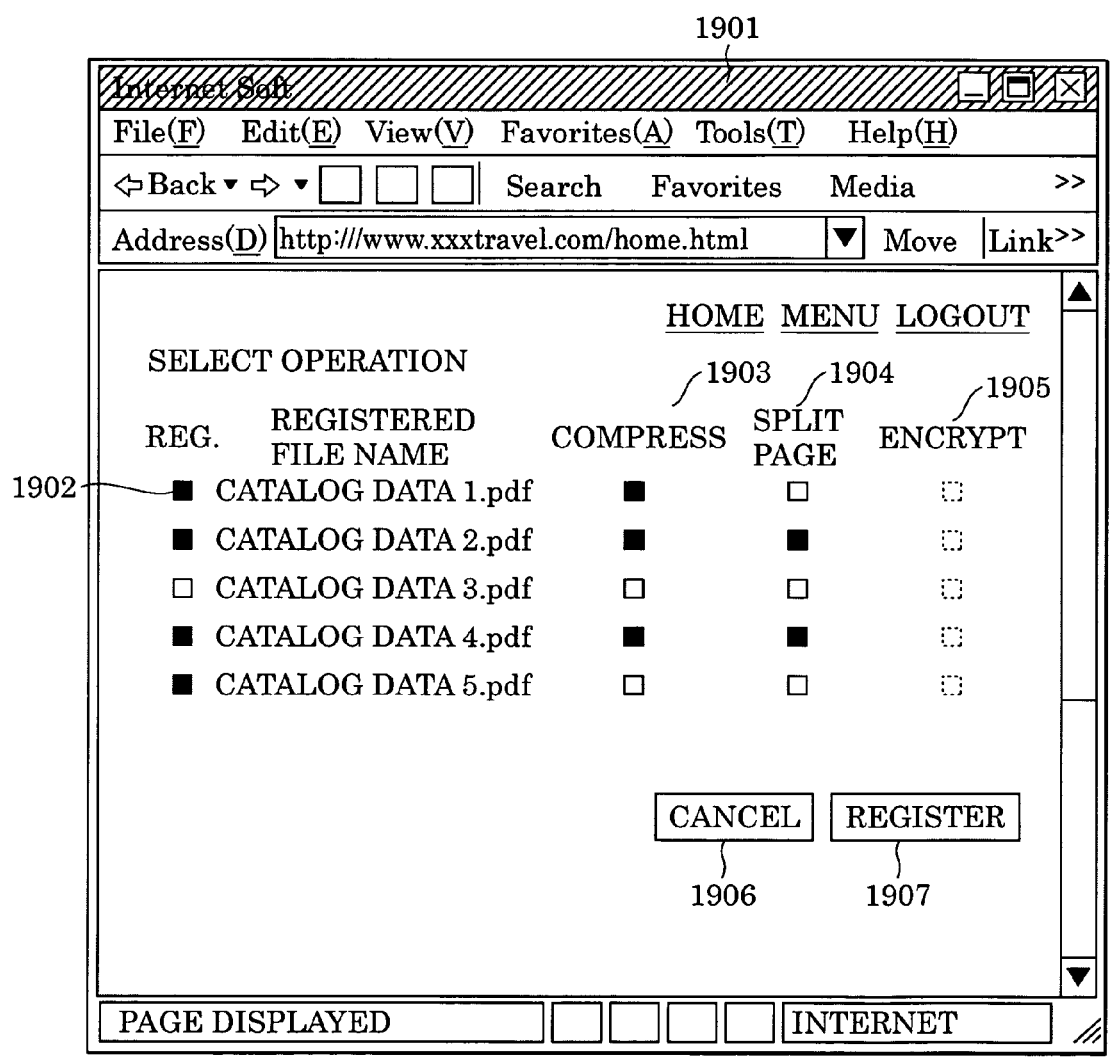
FIG. 11 shows an example of a registration confirmation screen for confirming catalog data to be registered in a PC server.

FIG. 11 illustrates an example of a registration confirmation screen 1901 for confirming catalog data to be registered in the PC server. The registration confirmation screen 1901 is a setting screen on which only the items specified in FIG. 9 are selectable, for setting a catalog processing method applied from the PC server at the time of registering a catalog.

This setting screen corresponds to the screen supplied from the PC server to the client PC 101, 102, 106, and the like in the same way as FIG. 8. Also, this setting screen is displayed in accordance with the instructions being made upon selection of the upload button 906 in FIG. 10A, or in accordance with the instructions upon selection of a confirmation button which will be provided.

In FIG. 11, the registration confirmation screen 1901 includes a catalog data list 1902 to be registered. At this time, the catalog data of which the data file type is not assigned a processing method at the time of registration is automatically deleted from the catalog data list 1902. Even the catalog data displayed on the catalog data list 1902 can be omitted from the objects of registration in the PC server by leaving the checkbox on the head of the catalog data line unchecked. In an example in FIG. 11, "catalogdata3.pdf" is not registered in the PC server.

File editing processing functions 1903, 1904, and 1905 are applied to catalog data in the PC server as a processing method at the time of registering catalog data in the PC server. The checkbox(es) of the processing method(s) set according to the data file type is/are displayed in a box outlined with a solid line, and the checkbox(es) of the processing method(s) not set is/are displayed in a box outlined with a dashed line. The checkboxes outlined in dashed lines cannot be selected. The checkboxes outlined in dashed lines correspond to the items set so as not to be used in the above-described setting screen in FIG. 9 by the PC server.

In this example, the only catalog data type displayed on the catalog data list 1902 is the PDF file type, and the compression function 1903 and the split page function 1904 are selectable as set in the data file processing screen 2501 in FIG. 9. Therefore, the compression function 1903 and the split page function 1904 are available for selection of whether or not the processing of these functions is performed for every catalog data of the PDF type. For example, "catalogdata2.pdf" is set such that the compression processing 1903 and the split page processing 1904 are executed at the time of registration on the PC server. Note that the extension offered via the screen in FIG. 11 is not restricted to PDF; for example, data files having an extension set via the setting screen in FIG. 9 are offered.

Upon a cancel button 1906 being selected, registering catalog data in the PC server is canceled. Upon selection of a register button 1907 being selected, the catalog data selected (having the checkbox at the head of the line of the data file) in the catalog data list 1902 is registered in the PC server.

Next, the PC server which received the registration request of the selected catalog data prepares for registration of the catalog data by editing the catalog data in accordance with the processing method set on the registration confirmation screen 1901 in FIG. 11, and temporarily registers the catalog data prepared for registration in the database (Step S608 of FIG. 6). At this time, with regard to the catalog data assigned with the split page processing, the PC server splits the catalog data in increments of pages so as to generate a data file (hereinafter, referred to as "page data") corresponding to each page. Let us say that at this time, the file name of the generated data file is a name with a five-digit page number assigned to the file name of the catalog data. However, the method for creating a file name is not restricted to the above-described method. Furthermore, the PC server generates thumbnail images corresponding to the catalog data and the page data, and then completes preparation for registration. Note that the catalog data and the page data of which preparation for registration have been completed are temporarily registered in the database included in the PC server, but it is not assumed that the catalog data and the page data are registered in the database in the event that correlation with tour-product information and the like is not performed.

In the event that that preparation for registration on the database has been normally completed, the PC server transmits a screen for notifying the client PC 101 that preparation for registration has been normally completed.

Figure 12:
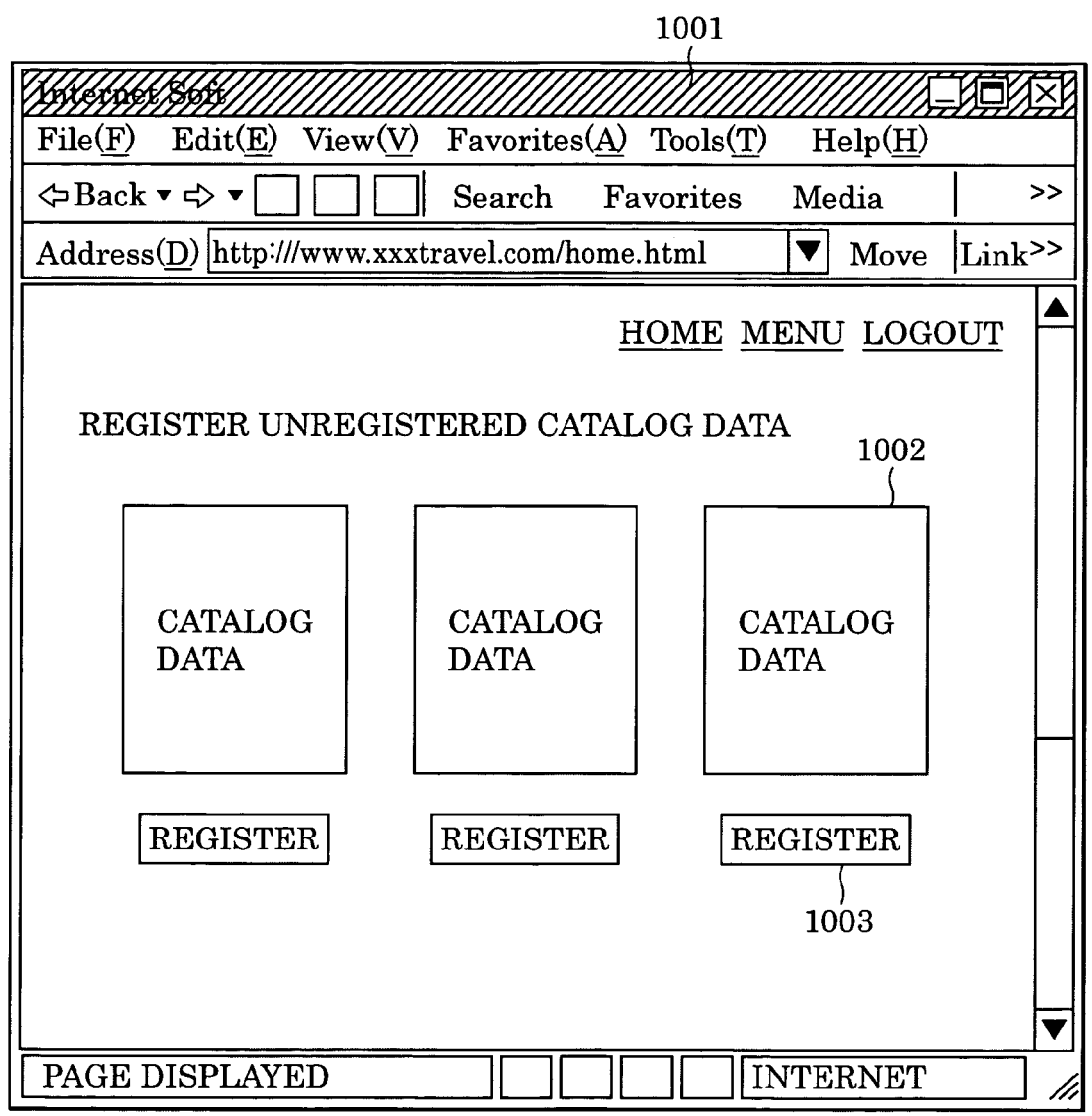
FIG. 12 shows an example of a catalog data list screen of which preparation for registration has been completed.

FIG. 12 illustrates an example of a catalog data list screen of which preparation for registration has been completed. This catalog data list screen is displayed along with the instructions upon selecting the registration button 1907 in FIG. 11 and success of registration, or the instructions as to the input unit of the catalog information upon selection of the registration button 803 in FIG. 8.

FIG. 12 displays a catalog data list screen 1001 of which preparation for registration has been completed. The catalog data list screen 1001 includes a thumbnail image list 1002 of catalog data which is transmitted to the PC server, of which preparation for registration has been completed, but has not yet been registered in the database. Upon selection of a registration button 1003, registration processing on the database of catalog data, e.g., the file management master table 404 or the like is performed, and correlation processing between the catalog data and the corresponding catalog information set on a catalog information setting screen 1101 (shown in FIG. 13 and described later) is performed. Upon the thumbnail image 1002 of the catalog data being selected, the catalog information setting screen 1101 is displayed, and the catalog data information to be correlated with the catalog data can be set.

Next, the system controller selects the thumbnail image 1002 of the catalog data on the catalog data list screen 1001 so as to display the catalog information setting screen 1101, and performs setting instructions of catalog information to be correlated with the catalog data (Step S609). In response to the setting instructions from the client PC 101, the PC server registers the catalog information in the database master tables 408, 501, and the like.

Figure 13:
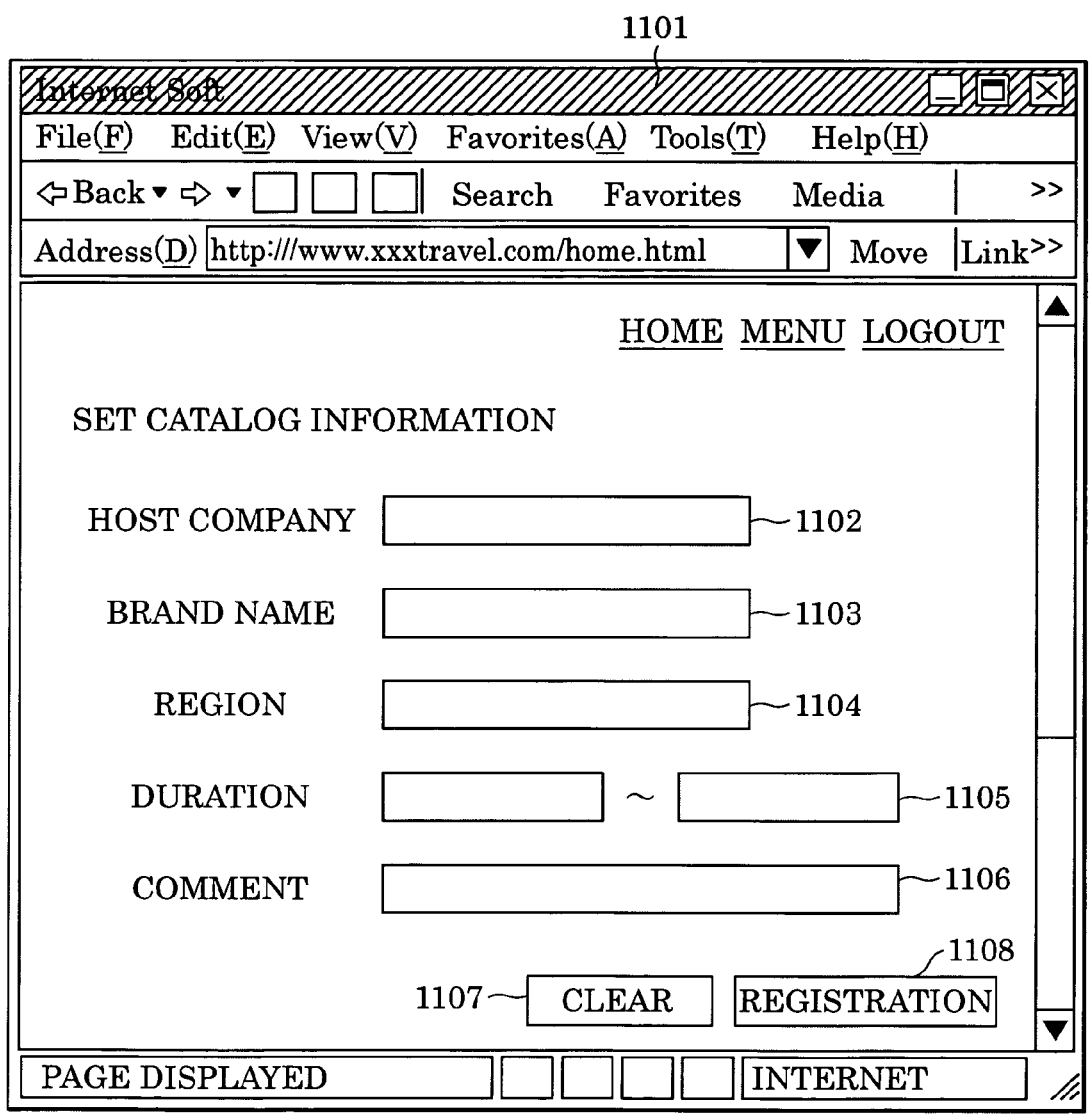
FIG. 13 shows example of a catalog information setting screen for registering catalog information.

FIG. 13 illustrates an example of the catalog information setting screen 1101 for registering tour information contents to which an attribute is added in the PC server. FIG. 13 corresponds to the setting screen for setting catalog information correlated with the catalog identified based on the instructions as to the catalog information registration button 803 in FIG. 8, and the instructions as to the any one of the registration buttons 1003 in FIG. 12.

In FIG. 13, the catalog information setting screen 1101 includes setting items 1102-1106 registered in the data-item-value master table 502, and the like. FIG. 13 illustrates a case in which catalog data is a tour catalog and the catalog information setting screen 1101 includes entry fields for the name of a company hosting the trip 1102, the brand name of the trip 1103, the area information 1104 of the destination, the valid period 1105 of a catalog, and comment information 1106 regarding other catalogs.

Upon a clear button 1107 being selected, all of the catalog information input corresponding to a setting item is cleared. Upon a registration button 1108 being selected, all of the catalog information input corresponding to a setting item is registered in the data master tables 408, 501, and the like.

Next, the system controller selects the registration button 1003 (of FIG. 12) corresponding to the catalog data to which catalog information is set so as to instruct the PC server to register the catalog data (Step S610 of FIG. 6). In response to the registration instructions, the PC server registers the catalog data in the database (Step S611). At this time, the PC server performs correlation processing between the catalog information which is set and the corresponding catalog data. In this registration processing of catalog data, the data to be registered includes not only catalog data but also page data. With regard to page data, all of the page data is registered in the file management master table 404, or the like, as well as the catalog data to be split. Moreover, the corresponding thumbnail image files are registered in the file management master table 404, or the like.

The registration processing for registering catalog data and catalog information in the database ends at the processing in Step S612. Subsequently, the system controller performs registration of tour-product information described on the catalog and correlation with the catalog data registered in the database.

The system controller sends a request for reading out catalog data by operating the client PC 101 (Step S613). In response to the request, the PC server reads out the catalog data not correlated with tour-product information from the database so as to send the readout catalog data back to the client PC (Step S614). Next, the system controller correlates the catalog data read out in the client PC 101 with tour-product information. For example, in response to the instructions as to the tour-product information registration button 804 in FIG. 8 being selected so as to select predetermined catalog data on the screen in FIG. 12 (instructions as to the registration button), the screen in FIG. 14 is provided to the client PC 101, or the like.

Figure 14:
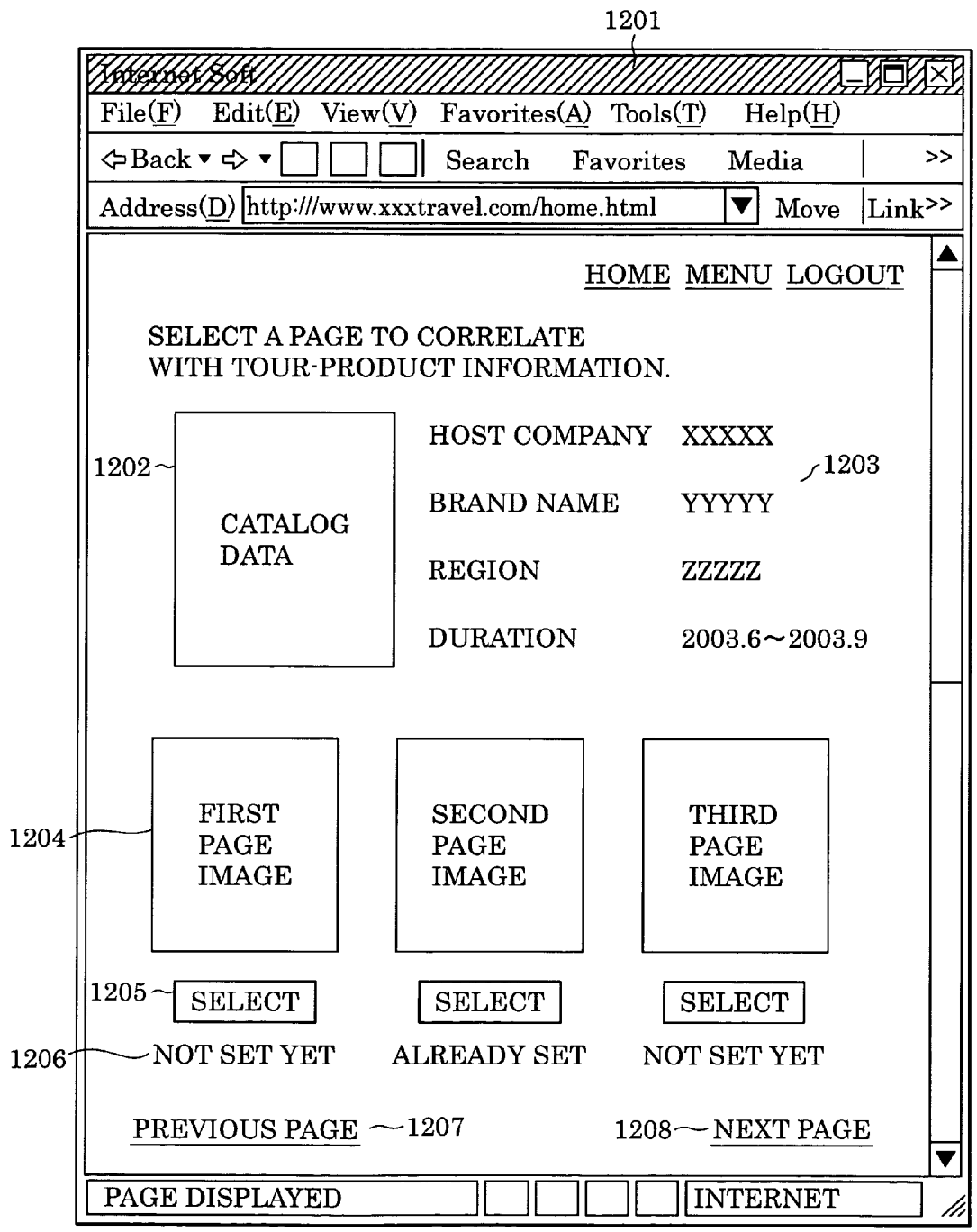
FIG. 14 shows an example of a catalog data information display screen.

FIG. 14 illustrates an example of a catalog data information display screen 1201 that displays a list of the catalog information of the readout catalog data and the page data split from the catalog data. The catalog information display screen 1201 includes image data of the catalog data 1202 in which cover image data is displayed as a thumbnail image, for example. The catalog information display screen 1201 also includes a list of the catalog information 1203 correlated with the catalog data.

The catalog information display screen 1201 also includes a list of the thumbnail image of the page data 1204 split from the catalog data. While the page data 1204 for three pages is displayed in FIG. 14, the other page data can be displayed on the catalog data information display screen 1201 by selecting a previous page button 1207 or a next page button 1208, and switching the current display. The screen of the page data in real size can be displayed by selecting the thumbnail image of each page data.

A selection button 1205 is provided which upon being selected causes a tour-product information setting screen (1301 in FIG. 15 which is described later) to be displayed which enables tour-product information to be set to the page data. A tour-product information setting flag 1206 indicates whether or not tour-product information is set to each page. For example, in FIG. 14, "not set yet" is displayed for the page data to which tour-product information has not been set and "already set" is displayed for the page data for which tour-product information has already been set.

Figure 15:
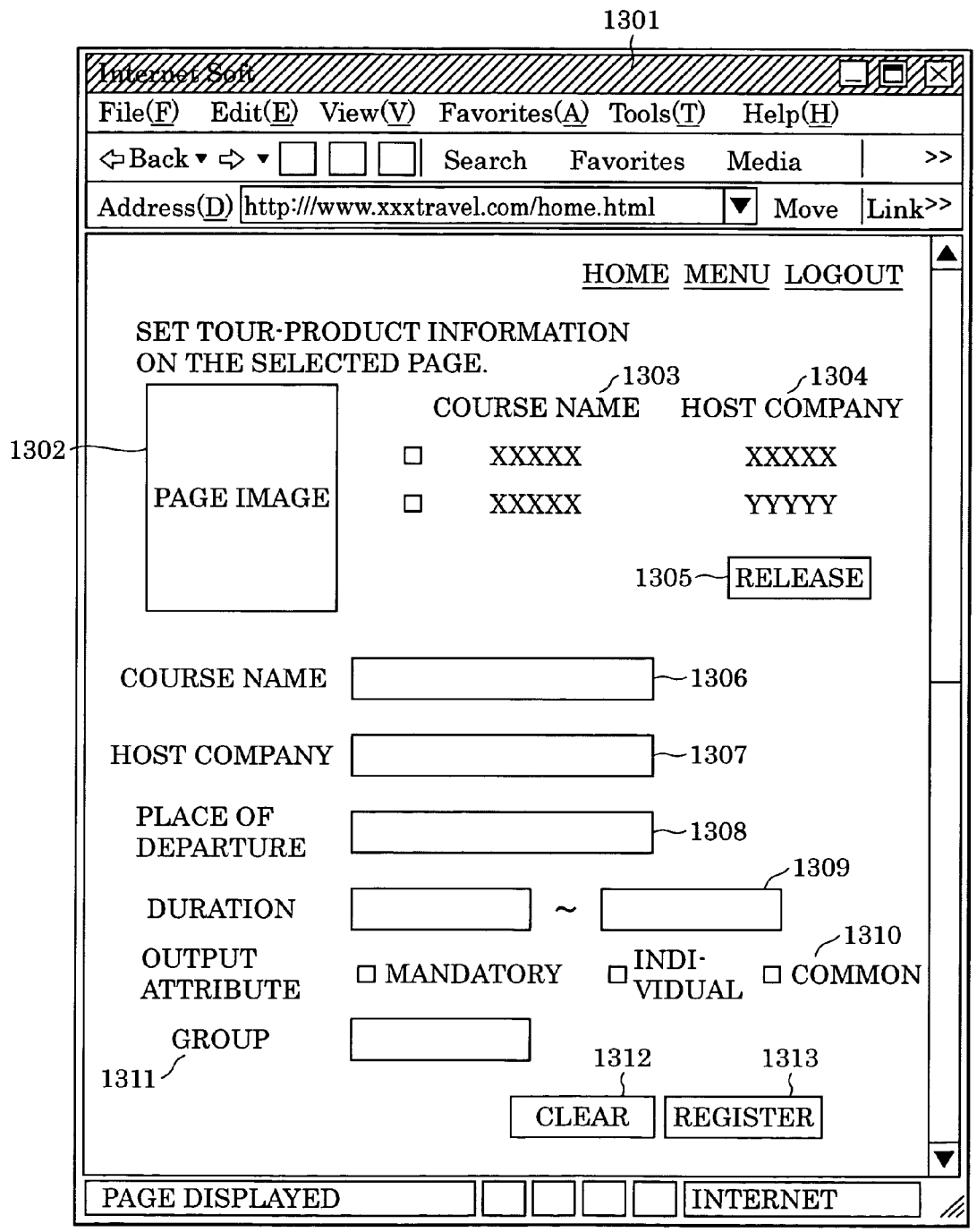
FIG. 15 shows an example of a page tour-product information setting screen for setting tour-product information as to each page data.

FIG. 15 illustrates an example of a tour-product information setting screen 1301 for registering tour information contents to which an attribute is added in the PC server and for setting tour-product information for each page data. This screen in FIG. 15 is prepared for each page 1204 shown in FIG. 14 described above.

The tour-product information setting screen 1301 includes a thumbnail image 1302 of the page data selected in the catalog data information display screen 1201 (FIG. 14). A list of the tour-product information 1303, 1304 correlated with the page data beforehand is displayed in the tour-product information setting screen 1301. In FIG. 15, an example of tour catalogs is shown which include a course name 1303 and the name of a company hosting the tour 1304. Here, all that is necessary is to identify tour-product information, thereby enabling other information, e.g., abbreviations and the like to be displayed.

The tour-product information setting screen 1301 includes a release button 1305. Upon the checkbox at the head of the line of the tour-product information correlated with the corresponding page data in the above-described tour-product information list being selected and then the release button 1305 being selected, the correlation between the selected tour-product information and the corresponding page data can be released. New tour-product information can be set to the corresponding page data using setting boxes 1306 through 1311. In the exemplary tour-product information setting screen 1301 shown in FIG. 15, the setting boxes include: a setting box for the name of a tour course 1306, a setting box for the name of a company hosting the tour 1307, a setting box for the place of departure 1308, and setting boxes for the tour duration 1309.

A printout attribute checkbox 1310 is provided for setting an output attribute for controlling output of tour information contents provided from the PC server in response to the instructions from a client PC. This output attribute includes an individual output attribute for every tour-product, and a common output attribute common to a plurality of tour-products. In the exemplary tour-product information setting screen 1301 of FIG. 15, the available types of the output attribute 1310 that can be selected and set are "mandatory", "individual", and "common". The attribute "mandatory" is added to page data that is mandatory for every user, e.g., in the case of a tour catalog, this attribute is added to the page data including the terms of agreement of a tour catalog. While the user wants to specify the contents of a predetermined page (the first tour information contents) via a checkbox 2005 in later-described FIG. 26, the contents to which the attribute "mandatory" is set corresponds to the second tour information contents which is automatically selected without being specified by the user. The setting via the setting screen in FIG. 15 can be considered not as a printout attribute but as a display attribute since this setting is referred to when the PC server supplies a later-described display screen in FIG. 26 to a client PC.

The attribute "common" is added to the page data that is not mandatory information, but is information common to multiple tour-products described in the catalog data, e.g., in the event of a tour catalog, this attribute is added to the page data such as tour options information, and the like. The attribute "individual" is added to the page data that is individual information of each tour-product, e.g., in the catalog data in FIG. 10B, this attribute is added to the page data of "Malaysia trip" 907, "Thai trip" 908, and "Vietnam trip" 909 respectively.

A group setting box is provided, e.g., in the event that optional information is common to that of other page data, the keyword related to the common optional information and the identification information that can be identified as the same group is input and set. For example, in later-described FIG. 26, in the event that the page related to "river trip" is selected via the checkbox 2005 in FIG. 26, the page of "comments on the river trip" correlated with the selected page according to "river trip" is synchronously selected on the setting screen in FIG. 26. Note that when certain page data is printed out, other page data of which the optional information correlated with the keyword is common to that of the selected page data is also printed out. That is to say, in the event that predetermined contents (the first tour information contents) is specified through the checkbox 2005 in FIG. 26, the contents (the second tour information contents) correlated with the predetermined contents is automatically selected in the PC server. This means that the PC server includes a grouping module for grouping multiple pages based on the identification information (keyword and the like) input through the group setting box 1311 in FIG. 15.

Upon selecting a clear button 1312, all of the information input in the tour-product information setting screen 1301 is cleared. Upon selecting a registration button 1313, the input tour-product information and the like is registered in the database, and the information correlated with this page data is also registered in the database. For example, the tour-product information input to the item setting boxes 1306 through 1309 is registered in the data master table 408 or the like, the printout attribute selected in the printout attribute checkbox 1310 is stored in the output control flag and the like of the page output control table 403, and the keyword input to the group setting box 1311 is stored in the assigned block information and the like in the page output control table 403. These tour-product information, printout attribute, and keyword are correlated with page data, the page data is registered in the file management master table 404 and the like.

As described above, the system controller sets the tour-product information of desired page data through the tour-product information setting screen 1301, and requests the PC server to register the tour-product information (Step S615). In response to the request, the PC server registers the tour-product information which is set in the database as described above (Step S616). In the event that the registration processing is normally completed, the flow proceeds to Step S617, where the PC server performs correlation processing between the page data and the tour-product information as described above.

Next, in the event that the settings of the desired page data, consequently, the tour-product information of the catalog data is completed by repeating the processing from Step S615 to Step S617, the system controller sets the display attribute and the printout attribute for every tour-product information correlated with the catalog data (Step S618). The printout attribute can be registered with the tour-product information setting screen 1301 in FIG. 15, and can also be set with the setting screen for every tour-product information in FIG. 18. Upon the display attribute and printout attribute being set for every tour-product information, the PC server registers the display attribute of the tour-product information in the page master table 402 or the like, and the printout attribute on the page output control table 403 or the like (Step S619).

Next, the system controller instructs the PC server to set disclosure/nondisclosure of the registered catalog data and page data, and the catalog information and the tour-product information correlated with the registered catalog data and page data over the Internet (Step S620). In response to the instructions, the PC server registers the disclosure/nondisclosure status set on a disclosure setting screen 1401 (shown in FIG. 16 and described below) in the data master table 408 or the like so as to set the disclosure/nondisclosure of the catalog data (Step S621).

Figure 16:
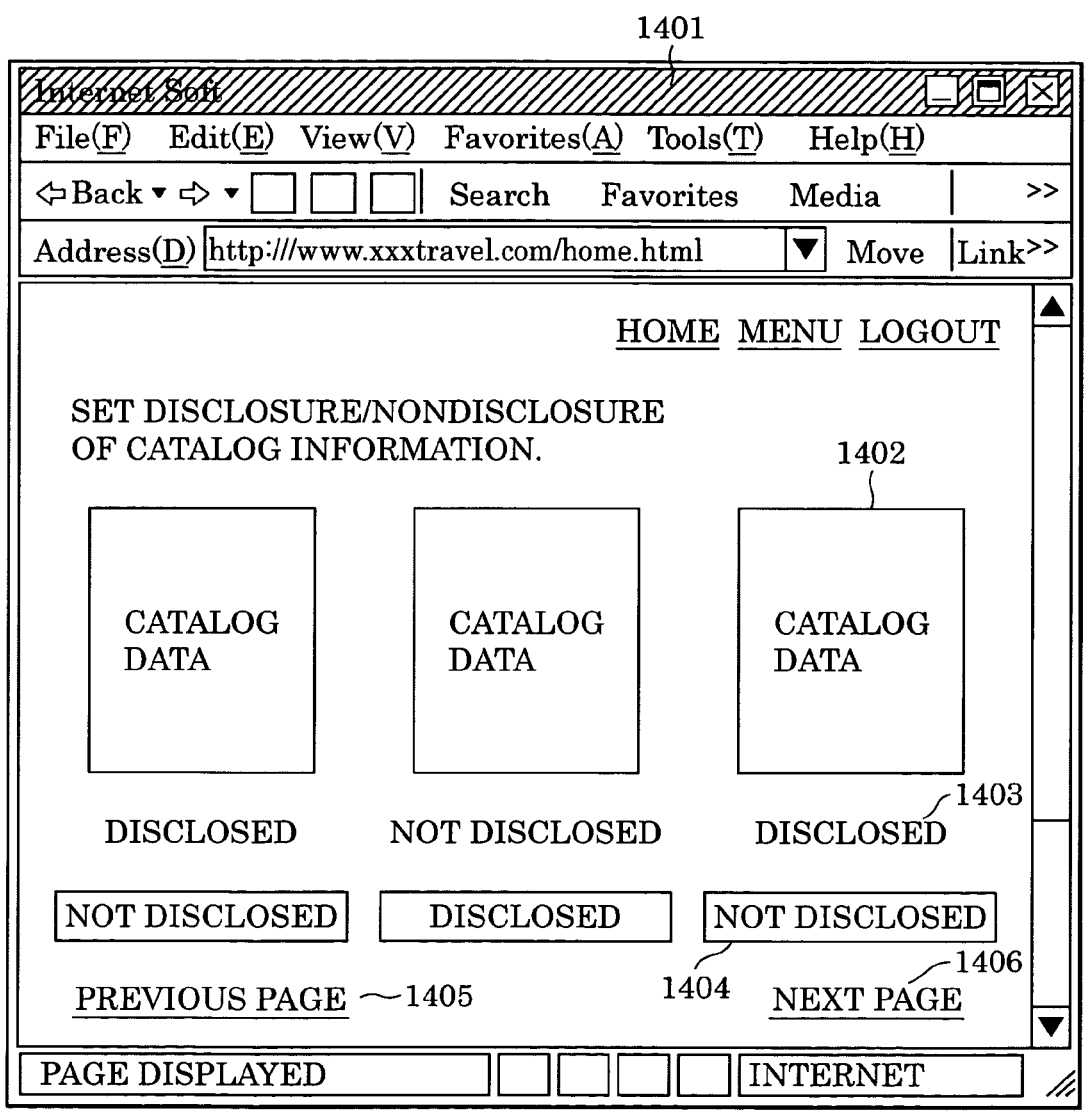
FIG. 16 shows an example of a disclosure setting screen for setting disclosure/nondisclosure of catalog data over the Internet.

FIG. 16 illustrates an example of a disclosure setting screen 1401 for setting disclosure/nondisclosure of catalog data over the Internet. This screen 1401 shown in FIG. 16 is offered to the client PC 101 or the like according to the instructions as to the input unit of the catalog information disclosure setting button 806 (of FIG. 8) being selected.

The disclosure setting screen 1401 includes a thumbnail image list 1402 of a database, e.g., the catalog data registered in the file management master table 404. While three pieces of catalog data are displayed in FIG. 16, the other catalog data registered in the database can be displayed on the disclosure setting screen 1401 by selecting a previous button 1405 or a next button 1406 so as to change the current display.

A disclosure/nondisclosure status 1403 is provided for each catalog data. The displayed disclosure/nondisclosure status 1403 is "Disclosed" displayed for the catalog data to be disclosed, and "not disclosed" for the catalog data not to be disclosed. A disclosure/nondisclosure button 1404 is provided. Upon the disclosure/nondisclosure button 1404 being selected, the selected catalog data can be disclosed or cannot be disclosed. Moreover, the name of the button is switched to "disclosure" or "nondisclosure" depending on the status of disclosure/nondisclosure. This allows for data that is currently "disclosed" (as indicated by the disclosure/nondisclosure status 1403) to be changed to "non disclosed" and data that is currently "not disclosed" to be changed to "disclosed". Furthermore, with regard to predetermined tour-product of the selected catalog, or a predetermined page of the predetermined tour-product, "disclosure" or "nondisclosure" may be set on the server PC from the client PC 101 or the like.

Figure 7:
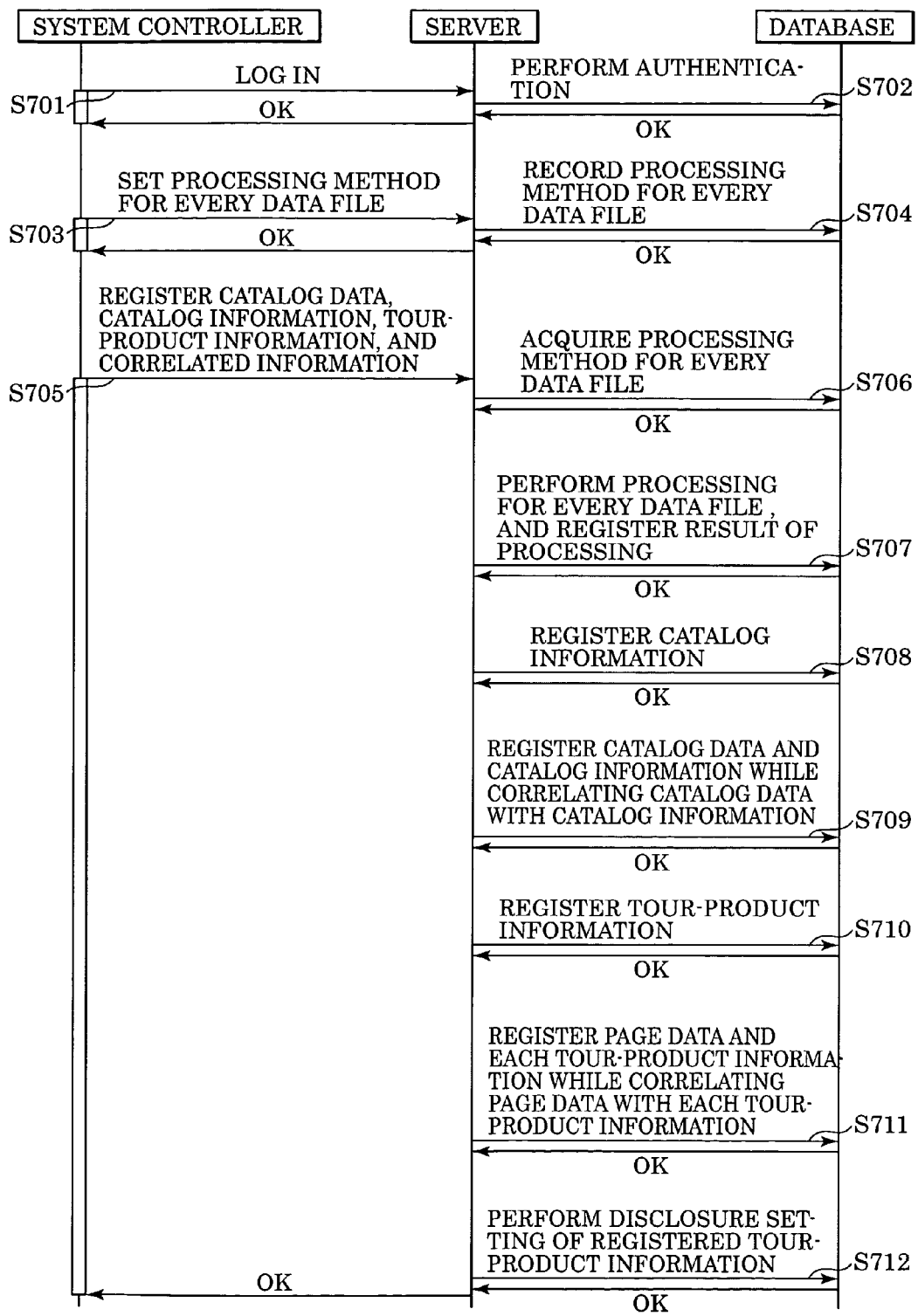
FIG. 7 is a flowchart illustrating another catalog data registration processing executed in the information output system in FIG. 1.

FIG. 7 is a flowchart illustrating another catalog data registration processing executed in the information output system in FIG. 1. Though the setting and correlation of catalog data, catalog information, and tour-product information is performed while changing screens one by one in the processing in FIG. 6, the setting as to all of the items is performed in block in the present processing, which is different from the processing in FIG. 6. It is assumed that the registration based on FIG. 6 and the registration based on FIG. 7 can be selectively performed from the client PC 101 or the like.

In FIG. 7, the processing from Step S701 to Step S704 is the same as the processing from Step S601 to Step S604 of FIG. 6 described above.

Next, data files and the setting information thereof required for block setting processing, e.g., catalog data and catalog information, or page data and tour-product information, or the like are all specified/set (Step S705), and registration of the data files and the setting information on the database is performed in processing from Step S706 to Step S712 according to the specification/setting in Step S705. Each processing step from Step S706 to Step S712 is the same as the processing in the corresponding step in FIG. 6 described above. Note that with regard to the processing method for every data file type executed in Step S706, a file storing the processing method corresponding to each data file type may be prepared.

First, the system controller controls the client PC 101 to display a block registration screen 1501 (shown in FIG. 17) so as to perform various settings of catalog data in block (Step S705).

Figure 17:
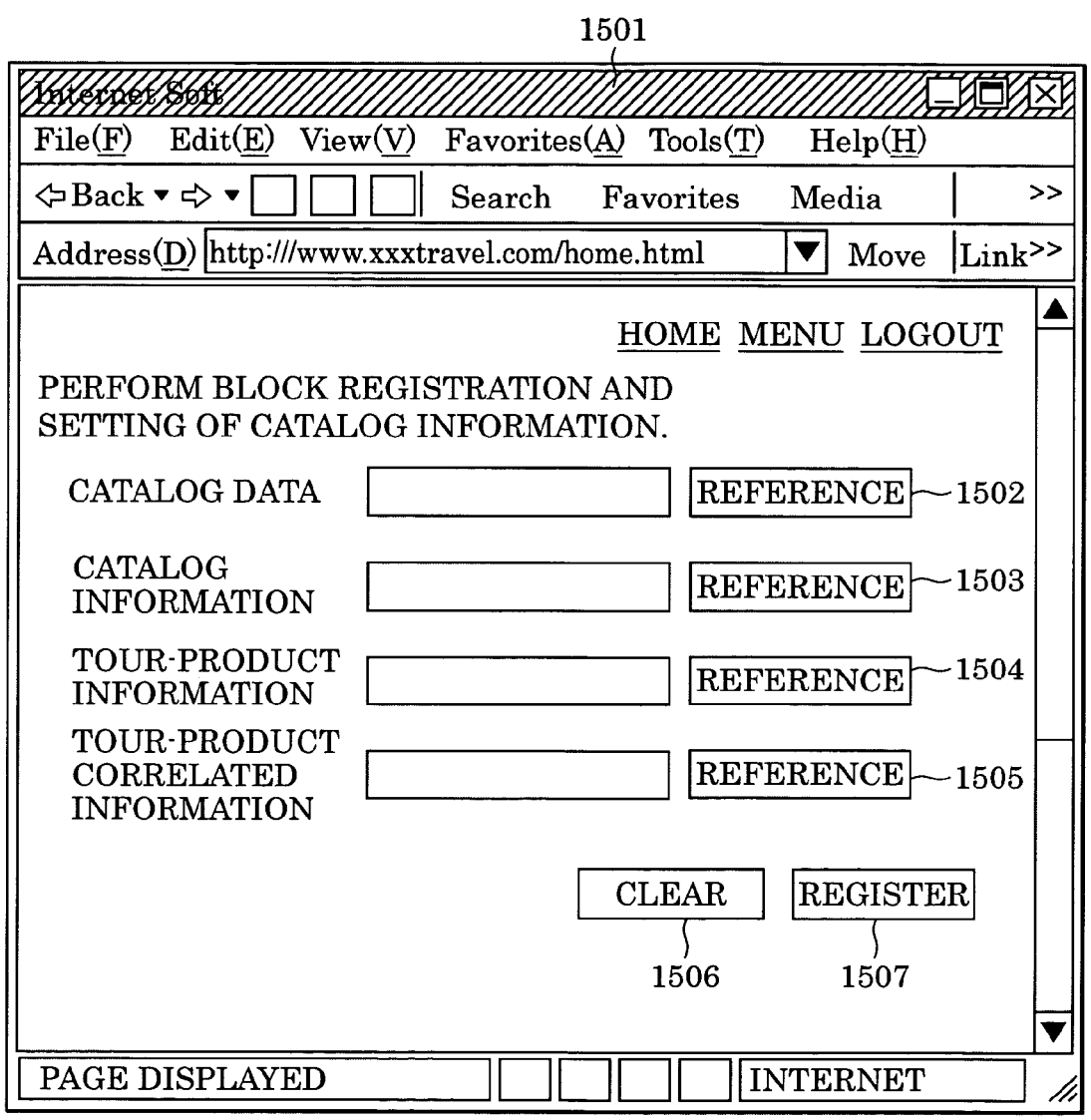
FIG. 17 shows an example of a block registration screen for performing various settings of catalog data in block in the processing in FIG. 7.

FIG. 17 illustrates an example of a block registration screen 1501 for performing various settings of catalog data in block in the processing in FIG. 7. Though not shown in FIG. 8, an input unit for displaying the screen in FIG. 17 on the client PC 101 may be provided in FIG. 8, such that the screen in FIG. 17 can be supplied to the client PC 101 from the server PC according to the instructions as to the input unit.

In FIG. 17, the block registration screen 1501 includes a setting box for catalog data 1502 where catalog data to be set is selected. A file reference screen (not shown) is displayed by selecting a reference button so as to select catalog data to be set.

The block registration screen 1501 also includes a setting box for catalog information 1503, a setting box for tour-product information 1504, and a setting box for a tour-product information correlation information file 1505. In the same way as catalog data, a file reference screen (not shown) is displayed by selecting a reference button so as to select a later-described catalog information setting file. In the same way as catalog data, a file reference screen (not shown) is displayed by selecting a reference button so as to select a later-described tour-product information setting file. In the same way as catalog data, a file reference screen (not shown) is displayed by selecting a reference button so as to select a later-described correlation setting file.

Upon a clear button 1506 being selected, all of the information input to the information setting file is cleared. Upon a registration button 1507 being selected, the PC server executes block registration processing of setting information input to catalog data and an information setting file and the like on the database. This processing for registering a plurality of catalog (including multiple tour-product attributes and page attributes) in block is executed by a block registration module provided in the PC server.

Block registration can be performed through the setting screen in FIG. 17, thereby reducing the load on the user in setting of attributes regarding each catalog, each tour-product, and each page.

Figure 18:
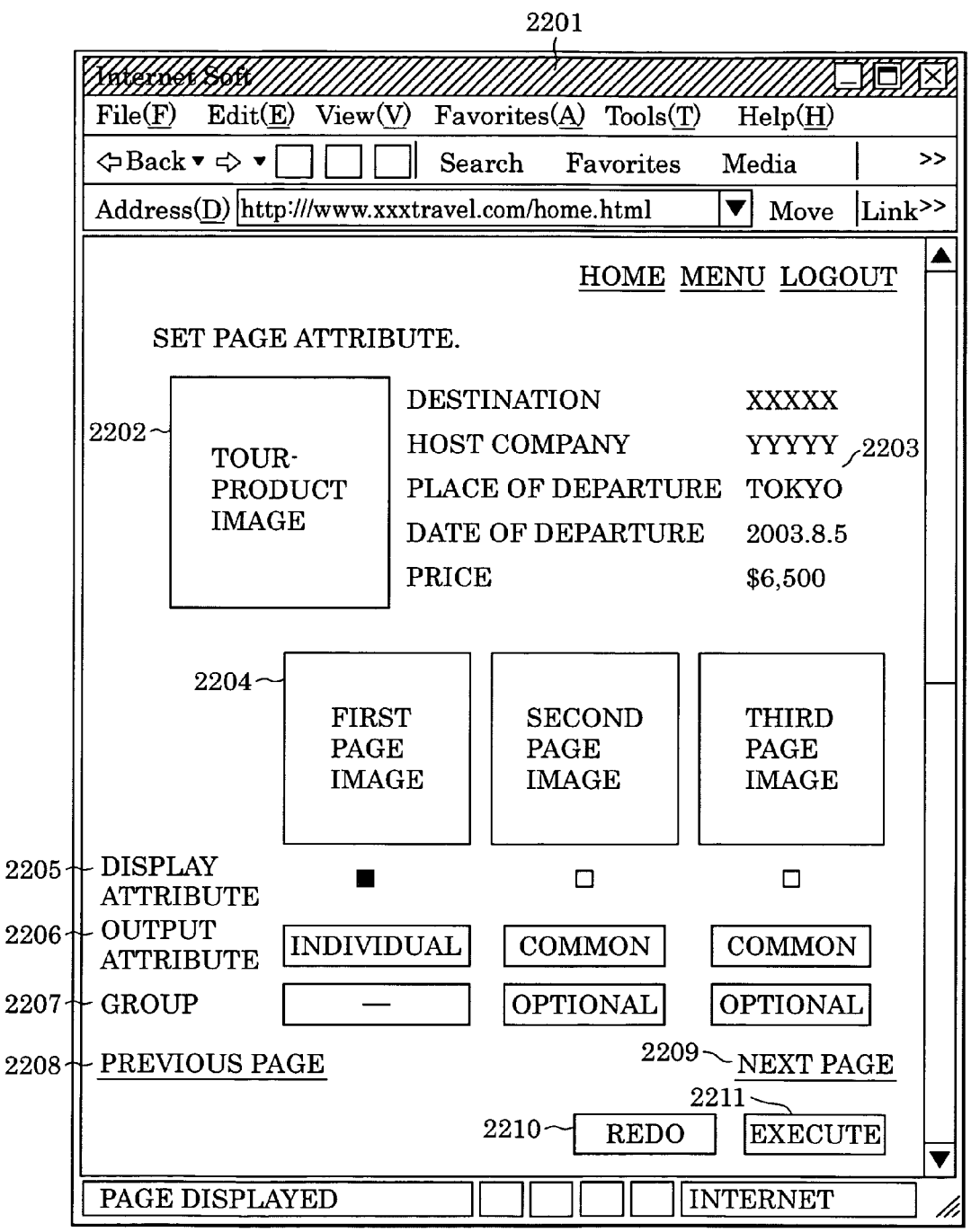
FIG. 18 shows an example of an attribute setting screen of tour-product information.
Figure 25:
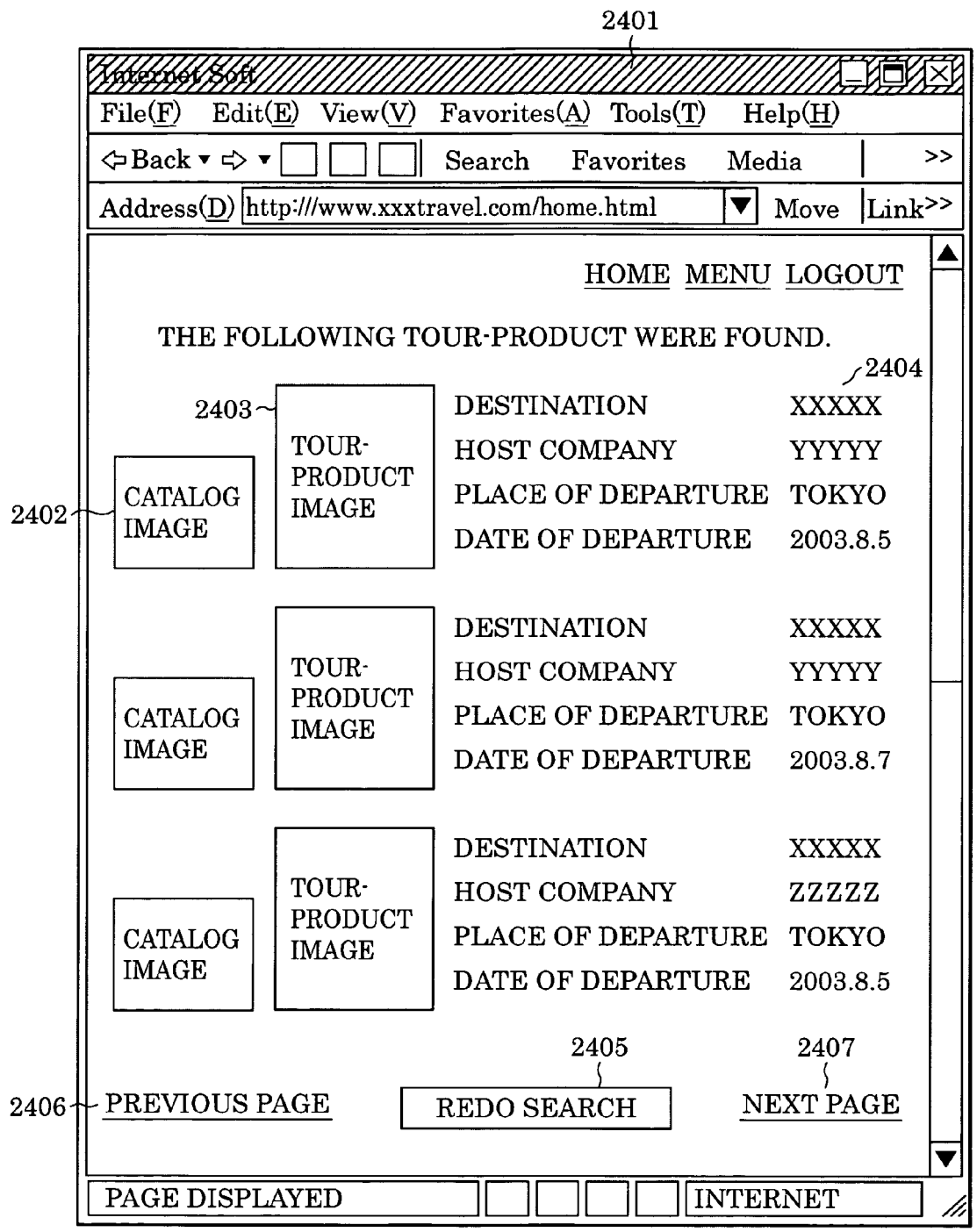
FIG. 25 shows an example of a tour-product search results screen.

FIG. 18 illustrates an example of an attribute setting screen 2201 of the second tour-product information displayed in the event that predetermined tour-product information is selected through, e.g., a setting screen 2401, such as shown in FIG. 25 and described later, following singular or a plurality of tour-product information being set on catalog data by the PC server from the client PC 101 or the like. The exemplary attribute setting screen 2201 shown in FIG. 18 corresponds to a setting screen for registering the tour information contents to which an attribute is added in the PC server.

The tour-product information attribute setting screen 2201 includes a thumbnail image 2202 indicating the selected tour-product information. Detailed tour-product information 2203 and page data 204 corresponding to the tour-product, i.e., the thumbnail image 2202 of the page data making up the tour-product are displayed. In this example, while three pages of correlated page data are displayed, in the event that page data more than three pages is correlated, the other correlated page data can be displayed on the attribute setting screen 2201 by selecting a previous page button 2208 or a next page button 2209 so as to switch the current display.

There is a display attribute setting checkbox 2205 for every tour-product, and the page data corresponding to the selected checkbox 2205 becomes the representative page of the tour-product information. The thumbnail image of the page data 2204 set as the representative page is displayed in later-described search of tour-product as the search results. An arrangement may be made wherein a representative page (image information) is set for every catalog.

The page data, of each page correlated with the selected tour-product information, expressing the tour-product in the most eligible manner is set as the representative page, here. Since pages of "mandatory" or "common" are not appropriate for the printout attribute of such a representative page, an arrangement may be made wherein only the page data having the printout attribute "individual" can be selected as a representative page. Moreover, as the initial value of a representative page of the corresponding tour-product information, an arrangement may be made wherein the page data which is first correlated with the corresponding tour-product information in the page data group having the printout attribute "individual" is set as a representative page.

There is printout attribute setting box 2206 in which the printout attribute can be set to "mandatory", "common", or "individual". Each printout attribute is the same as that in the tour-product information setting screen 1301 shown in FIG. 15.

There is a group setting box 2207 where the same keyword is set to the page data to be output in a set as a group. In FIG. 18, the second page and the third page are set as a group by the keyword "optional". The keyword mentioned here is the same as that of the group setting box 1311 in the tour-product information setting screen 1301 shown in FIG. 15.

Upon a redo button 2210 being selected, the display returns to the previous screen, where setting can be redone. Upon an execute button 2211 being selected, the input setting information is registered in the database. For example, the printout attribute set in the printout attribute setting box 2206 is stored in the output control flag and the like in the page output control table 403 for every page data, and the keyword input to the group setting box 2207 is stored in the assigned block information and the like in the page output control table 403 for every page data. The printout attribute and keyword are correlated with each page data, and the page data is registered in the file management master table 404 or the like.

In the tour-product information attribute setting screen 2201, in the event that a plurality of page data is selected as a representative page, the thumbnail image of the representative page is generated with all of the selected page data.

FIG. 19 illustrates an example of thumbnail image data in the event that a plurality of page data is selected as a representative page. Description will be made regarding the processing wherein an image attribute (specification of representative page) is made up of multiple pages, and representative pages which are specified corresponding to multiple pages are reduced so as to make up a singular representative page.

Figure 19A:
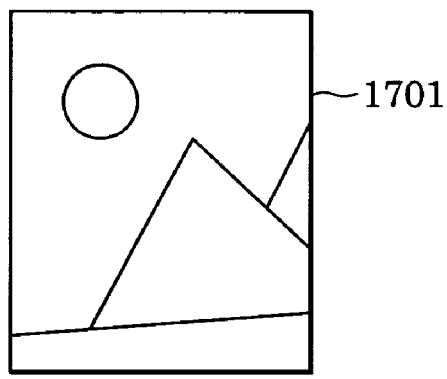
FIG. 19 shows an example of thumbnail image data in the event that a plurality of page data is selected as a representative page.
Figure 19B:
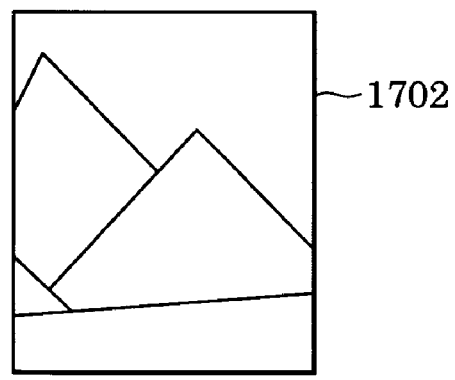
Figure 19C:
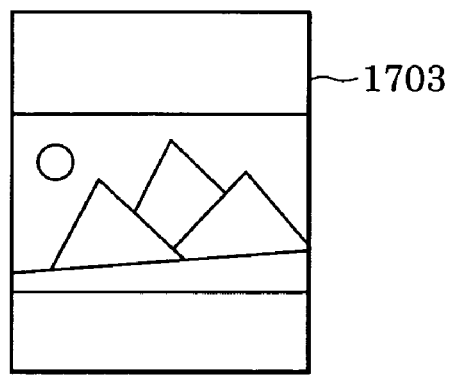

As shown in FIG. 19, a singular representative page is sometimes made up of center-spread pages in catalog data; in this case, any page data is set as a representative page. Here, there is a representative page one 1701 (of FIG. 19A) and a representative page two 1702 (of FIG. 19B). At this time, the image data corresponding to two pages of page data is synthesized as a representative thumbnail, and the synthesized image data is changed in magnification equivalent to one page size so as to generate a representative thumbnail image 1703 (FIG. 19C).

FIG. 20 shows an example of a catalog information setting file for setting catalog information in block on catalog data selected in Step S705.

In FIG. 20, the data format of the catalog information setting file is the CSV (Common Separated Value) format. The example shown in FIG. 20 includes the number of the catalog information 1601 stored in the catalog information setting file, the file name 1602 of each catalog data stored in the catalog information setting file, and the catalog information 1603 corresponding to each catalog data. With regard to the catalog information, the items corresponding to the setting items in the catalog information setting screen 1101 in FIG. 13 are set. FIG. 20 further displays setting of processing to be executed at the time of registering each catalog data. This processing includes compression processing 1604, split-of-page processing 1605, and encryption processing 1606. The processing functions displayed on the catalog information setting file correspond to the processing functions registered in the PC server side. In the event that the processing is executed on the corresponding catalog data, "ON" is set, and in the event that the processing is not executed on the corresponding catalog data, "OFF" is set.

With the catalog information setting file, the number of the combinations made up of reference numerals 1602 through 1606 to be stored in the catalog information setting file is the same as the number of sets of the catalog information 1601. While the above-described catalog information setting file is the CSV format, the format of the file is not restricted to any particular format.

FIG. 21 is an example of a tour-product information setting file for setting tour-product information in block. In FIG. 21, the tour-product information setting file also has the CSV format. The tour-product information setting file includes the number of the tour-product information 2601 stored in the tour-product information setting file. The tour-product information setting file also includes a tour-product name 2602 and the tour-product information to be set 2603. With regard to the tour-product information, the items corresponding to the setting items of the tour-product information in the tour-product information setting screen 1301 in FIG. 15 are set.

With the tour-product information setting file, the number of the combinations made up of the tour-product name 2602 and the tour-product information 2603 to be stored in the tour-product information setting file, is the same as the number of sets of the tour-product information 2601. While the tour-product information setting file has been described as the CSV format, the format of the file is not restricted to any particular format.

FIG. 22 illustrates an example of a correlation setting file for setting tour-product information in block on each page data of the catalog data.

In FIG. 22, the correlation setting file also has the CSV format. The correlation setting file includes the number of the page data 1801 to be correlated. The correlation setting file also includes a catalog file name 1802, the page number 1803 of the page data to be correlated, the tour-product name 1804 of tour-product information to be correlated with each page data, and the disclosure information of each page data 1805 which is correlated.

With the correlation setting file, the number of the combinations of catalog file names 1802, page numbers 1803 of the page data to be correlated, the tour-product names 1804 of tour-product information to be correlated with each page data, and the disclosure information of each page data 1805 which is correlated to be stored in the correlation setting file is the same as the number of sets of the page data 1801 to be correlated. While the correlation setting file has been described as the CSV format, the format of this file is not restricted to any particular format.

Figure 23:
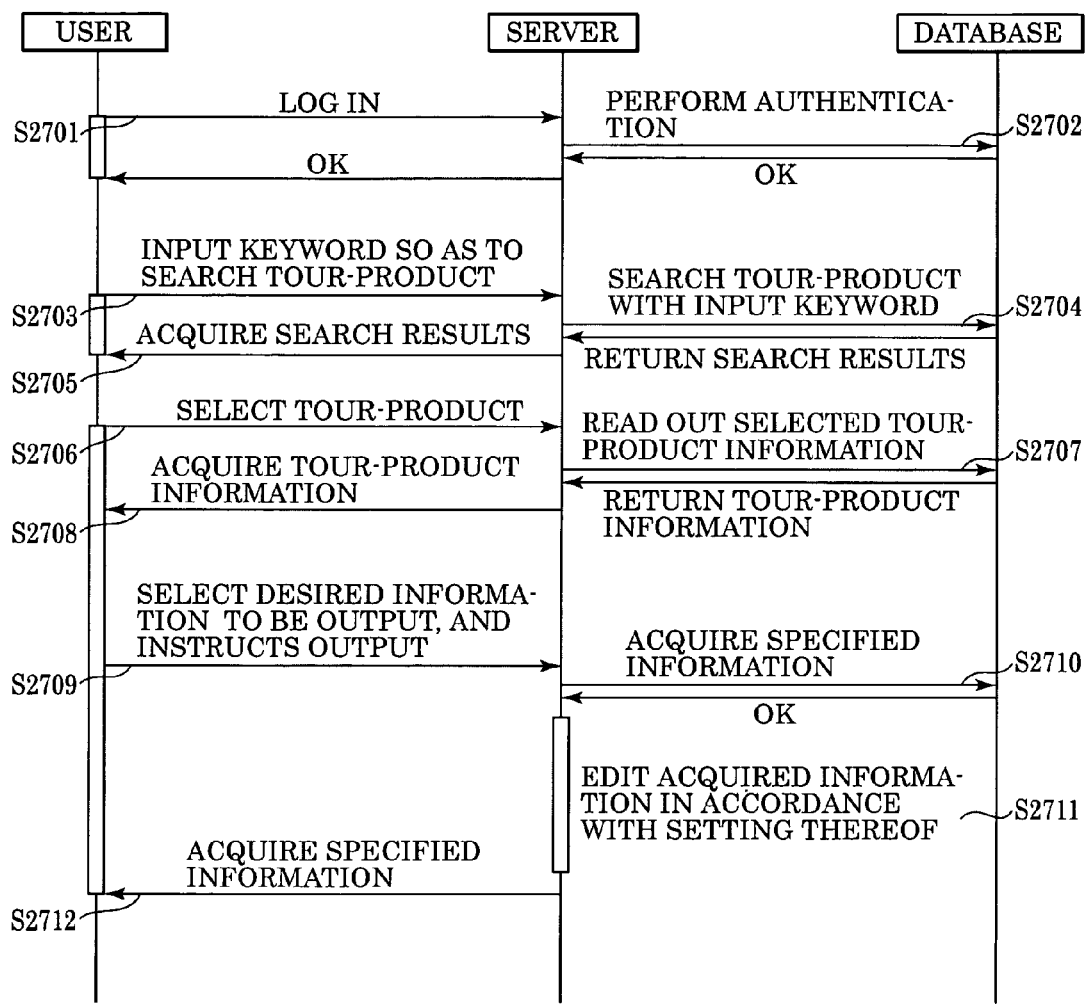
FIG. 23 is a flowchart illustrating catalog data output processing for searching and outputting catalog data to be executed in the information output system in FIG. 1.

Next, description will be made regarding the catalog data output processing executed in the information output system in FIG. 1. FIG. 23 is a flowchart illustrating catalog data output processing for searching and outputting catalog data to be executed in the client PC 106, 101, 102, and the like in the information output system in FIG. 1.

First, the user attempts to log into the system in FIG. 1 by inputting his/her account and password from the client PC 101 or the like (Step S2701), in response to this log-in, the PC server inquires regarding whether or not catalog data registration processing by the input account and password is permitted of the database 110 so as to perform authentication processing (Step S2702). Note that the above-described authentication processing may be authentication processing with other authentication information other than accounts and passwords. Here, in the event that catalog data registration processing is not permitted, the PC server transmits an error screen to the client PC 101. In the event that catalog data registration processing is permitted, the flow proceeds to the next step, and also a tour-product search screen 2301 (shown in FIG. 24 and described later) is displayed.

Next, the user sends a request for searching tour-product information by inputting a keyword on the tour-product search screen 2301 (Step S2703). In response to the request, the PC server searches through the database for the tour-product information corresponding to the input keyword (Step S2704), and transmits the tour-product search results to the client PC 101. In Step S2705, the user acquires the tour-product search results through a tour-product search result screen 2401 (shown in FIG. 25 and described later).

Figure 24:
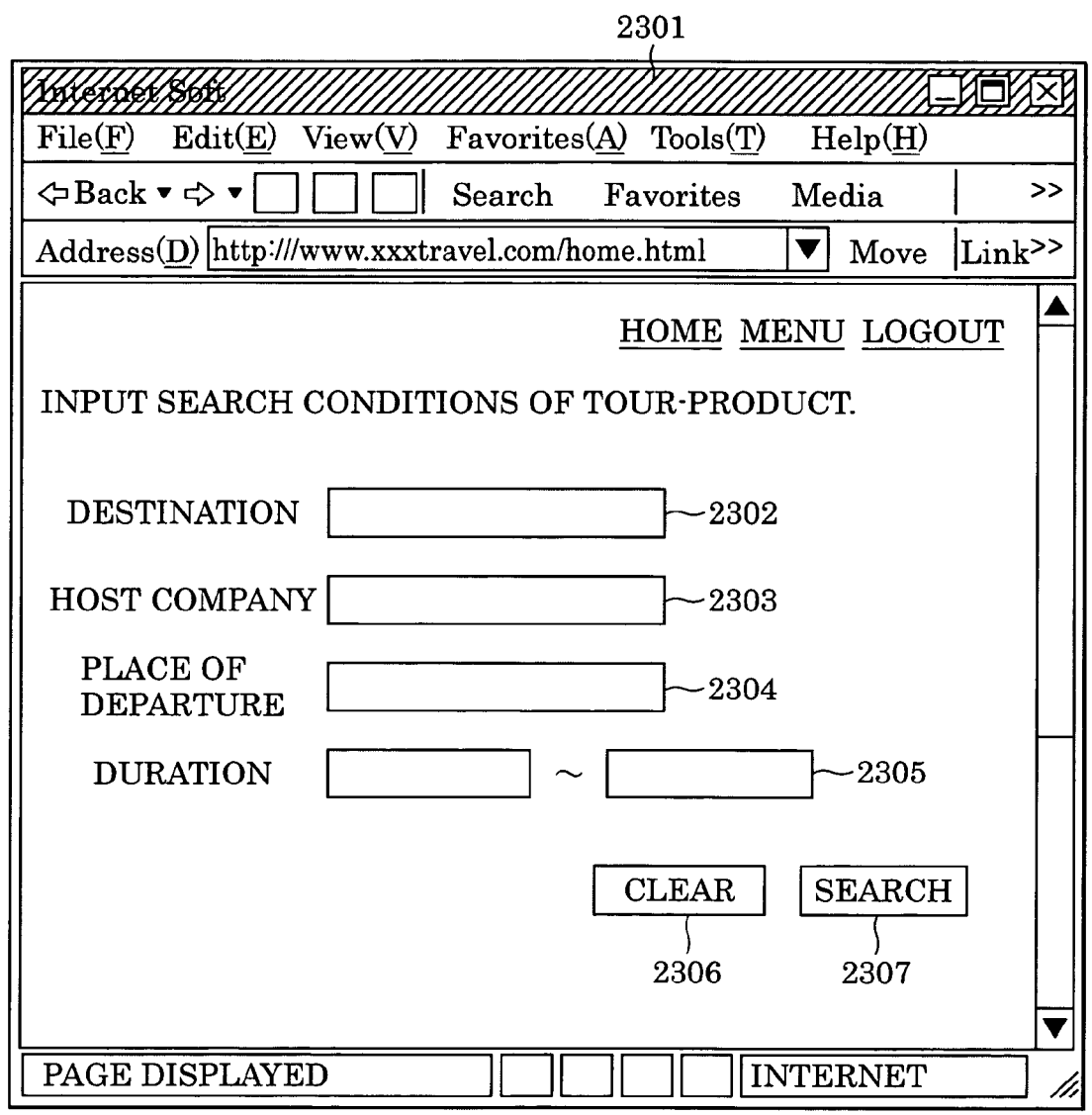
FIG. 24 shows an example of tour-product search screen for searching tour-product.

FIG. 24 illustrates an example of a tour-product search screen 2301 for searching tour-products. The search screen 2301 includes search items 2302 through 2305 input by the user. FIG. 24 illustrates a search example for tour-product.

The search items are managed by the database, and are not managed by the tour-product search screen 2301, and accordingly, are not restricted to the search items displayed here. The search items that can be input by the user include the destination of a tour 2302, a company hosting the tour 2303, the place of departure 2304, and a tour duration 2305. The user can execute a search by inputting at least one of these items.

Note that the tour-product search screen 2301 has the same configuration as the tour-product search screen in a conventional system, which has no search item for inputting a keyword such as "optional", and accordingly, the page data which has "optional" as a keyword cannot be searched in the conventional system. However, with the system in FIG. 1, all of the page data having "optional" as a keyword can be searched, as shown in later-described tour-product correlated information readout processing.

Upon a clear button 2306 being selected, the values of all of the items input on the tour-product search screen 2301 are cleared. Upon a search button 2307 being selected, the tour-product information stored in the data master table 408, and the like is searched according to the value of the input item.

A tour-product search screen is not restricted to the tour-product search screen 2301 shown in FIG. 24 and described above. For example, a map screen may be used, and in this case, selecting a destination on the map screen may display the tour-product information including the selected destination on the tour-product search result screen 2401. In the event that the PC server handles search processing, an arrangement may be made wherein columns in which various search conditions such as the number of tourists, price, discount conditions, female-only plans, male-only plans, family plans, sweetheart plans, and senior citizen plans are input as appropriate are provided on the PC server side, search result data (web display screen, printout data, or PDF data) is supplied (transmitted) to the client PC 106 serving as a search source.

FIG. 25 illustrates an example of the tour-product search result screen 2401. The tour-product search result screen 2401 includes catalog data thumbnail images 2402 on which the searched tour-product information is described, tour-product thumbnail images 2403, and simple tour-product information 2404. With regard to the tour-product thumbnail images 2403, the thumbnail image of the representative page of the corresponding tour-product information is displayed. Here, a representative page described in the display attribute setting checkbox 2205 and FIG. 18 is displayed on the client PC 101 or the like.

Upon a redo search button 2405 being selected, the display returns to the tour-product search screen 2301 (of FIG. 24), where the search can be redone.

While three pieces of tour-product information are displayed in FIG. 25, the other tour-product information as search results can be displayed on the tour-product search result screen 2401 by selecting a previous page button 2406 or a next page button 2407 so as to switch the current display.

The detailed information of the tour-product information and the page data information making up the corresponding tour-product can be displayed by selecting the tour-product thumbnail image 2403.

Next, the user selects the tour-product thumbnail image 2403 so as to instruct the PC server to select a desired tour-product (Step S2706 of FIG. 23), in response to the instructions, the PC server reads out the information related to the selected tour-product, e.g., the page data making up the corresponding tour-product and the detailed information of the corresponding tour-product information from the database, e.g., the file management master table 404 or the data master table 408, and sends the readout information back to the client PC 101 (Step S2707). Subsequently, in Step S2708, the user acquires the detailed information of the desired tour-product through a tour-product information display screen 2001 (shown in FIG. 26 and described later).

Now, description will be made in detail regarding tour-product correlated information readout processing in the PC server side in Step S2707.

Figure 28:
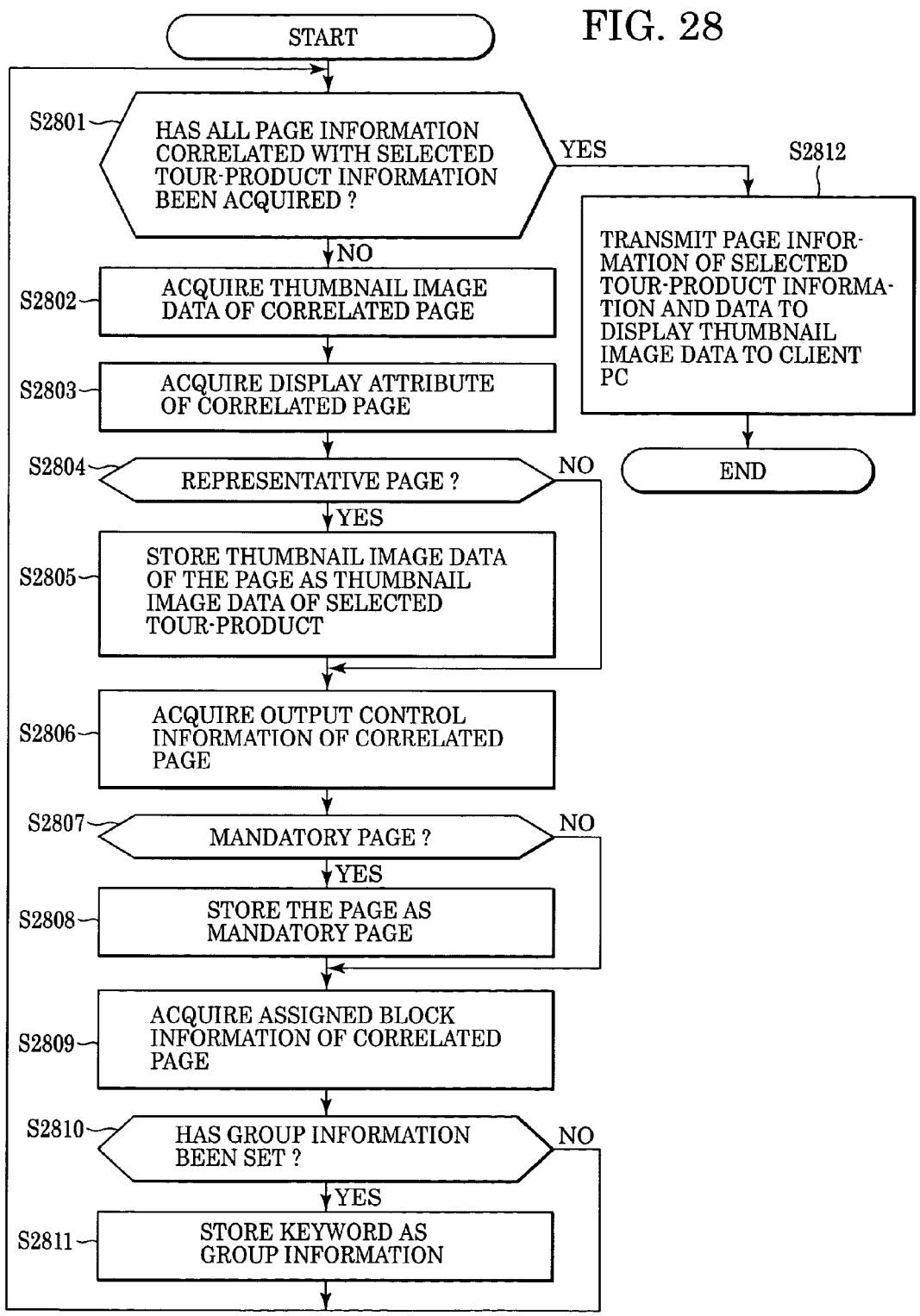
FIG. 28 is a flowchart of tour-product correlated information readout processing executed by the PC server.

FIG. 28 is the flowchart of tour-product correlated information readout processing executed in the PC server, which illustrates the detailed processing in Step S2707 or S2710 in FIG. 23.

First, the PC server confirms whether or not all of the page data correlated with the selected tour-product information has been acquired (Step S2801). If all of the page data has been acquired, the flow proceeds to Step S2812, and if all of the page data has not been acquired, the flow proceeds to Step S2802. The information acquired here corresponds to the information notified to the PC server corresponding to Step S2709 (of FIG. 23), which includes the terms of agreement contents, and the contents grouped into the page selected and instructed by the user as well as the information selected by the user through the tour-product information display screen 2001 shown in FIG. 26.

Next, the PC server acquires the thumbnail image data of the correlated page data from the file management master table 404 or the like in Step S2802. The file type of the thumbnail image data acquired here may be either JPEG or BMP.

Next, the PC server acquires the display attribute of the corresponding page data from the page master table 402 or the like in Step S2803. Information regarding whether or not the corresponding page data is the representative page of the selected tour-product information is stored in the display attribute.

Subsequently, in Step 2804, the PC server determines whether or not the corresponding page data is the representative page. In a case of other than the representative page, the flow proceeds to Step S2806, and in a case of the representative page, the PC server stores the thumbnail image data of the corresponding page data as the thumbnail image data of the selected tour-product information (Step S2805). The thumbnail image data of the representative page stored in Step S2805 is used as the tour-product thumbnail image data at the time of searching tour-product.

Next, in Step 2806, the PC server acquires the printout attribute of the corresponding page data from the page output control table 403 or the like. The attribute information at the time of printing out the corresponding page data is set to the printout attribute, which includes "mandatory", "individual", "common", and the like.

Subsequently, in Step S2807, the PC server determines whether or not the printout attribute of the corresponding page data is "mandatory". In the event that the printout attribute is not "mandatory", the flow proceeds to Step S2809, and in the event that the printout attribute is "mandatory", the flow proceeds to Step S2808, where the PC server stores that the corresponding page data is a mandatory page (Step S2808), and sets the corresponding page data so as to be selected in the event that the user selects page data to be printed out on the client PC 101.

Subsequently, in Step S2809, the PC server acquires the assigned block information of the corresponding page data from the page output control table 403. In the event that singular information is expressed by the corresponding page data and another page data making up one group, or in the event that the corresponding page data belongs to a group sharing the same information with other page data, the assigned block information stores the keyword common to the group.

Next, in Step S2810, the PC server determines whether or not the keyword is set to the assigned block information of the corresponding page data. In the event that the keyword is not set to the assigned block information, the flow returns to Step S2801, where the processing is repeated.

In the event that the keyword is set to the assigned block information, the PC server stores the keyword as group information (Step S2811).

The page data of which the assigned block information stores the keyword stored as group information is set by the PC server side such that switching of output on/off is simultaneously performed as a group in the event that the user selects page data to be printed out in the client PC 101.

Figure 26:
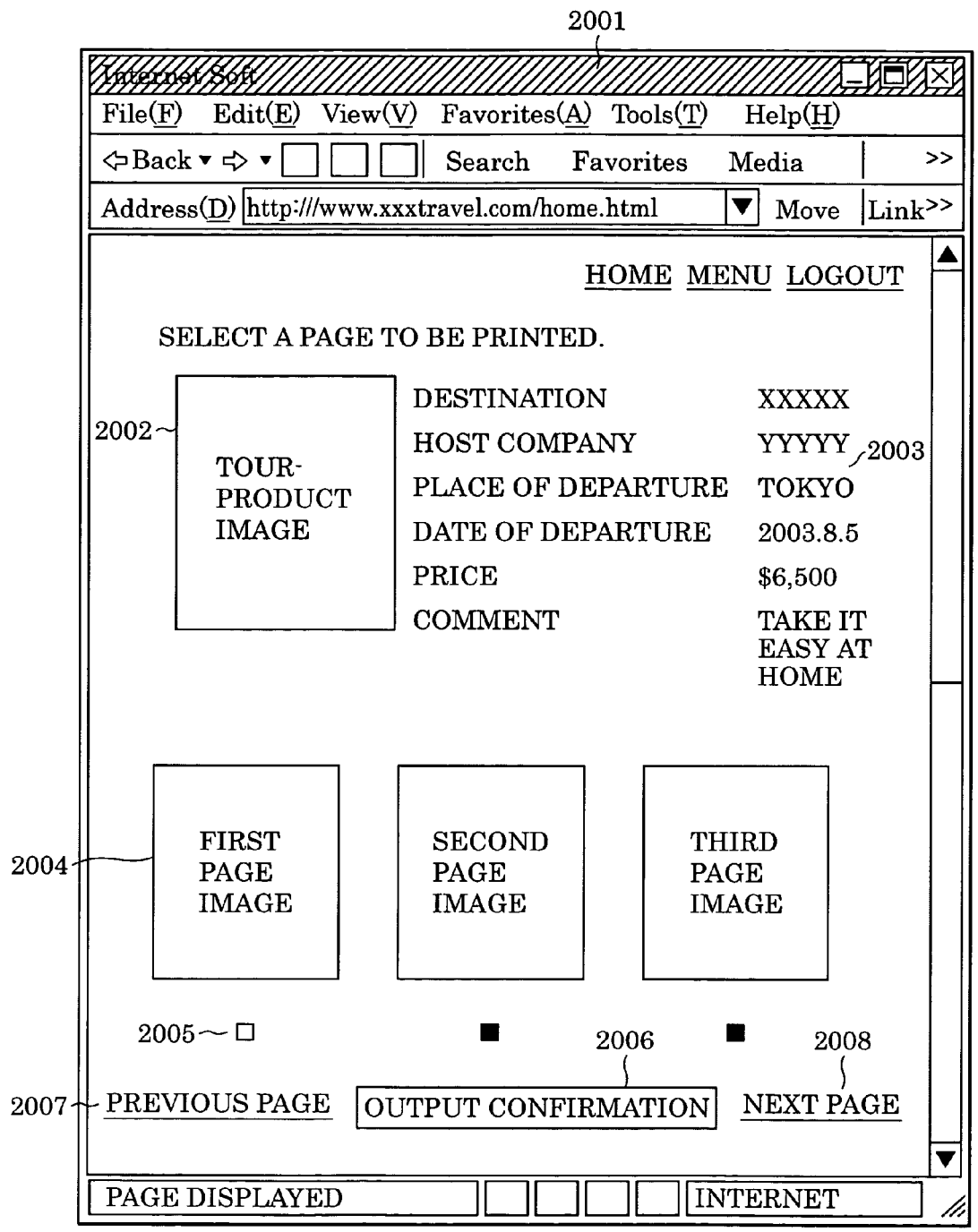
FIG. 26 shows an example of a tour-product information screen for displaying thumbnail image data and page data transmitted from the PC server.

As described above, following all of the page data correlated with the selected tour-product information being acquired by repeating the processing from Step S2802 to Step S2811, the flow proceeds to Step S2812, where the PC server generates data to be displayed on the client PC 101 side from the thumbnail image data read out from the file management master table 404 or the like, and the page data, and then transmits the data to the client PC 101, and the client PC 101 displays the received data on the tour-product information screen 2001 shown in FIG. 26 and described below.

Referring to FIG. 23, next, the user instructs the PC server to output tour-product information on the tour-product information screen 2001 (Step S2709). In response to the instructions from the client PC in Step S2709, the PC server refers to the information accumulated in the database 110, and consequently, sends a tour-product information screen 2001 such as shown in FIG. 26 to the client PC.

FIG. 26 illustrates an example of the tour-product information screen 2001 for displaying thumbnail image data and page data transmitted from the PC server in the client PC. In FIG. 26, the tour-product information screen 2001 includes the thumbnail image 2002 of the selected tour-product information, and thumbnail image of the representative page of the selected tour-product information is usually displayed. Detailed tour-product information, and the detailed information 2003 of tour course information is also shown in FIG. 26. The thumbnail image 2004 of correlated page data in the catalog data correlated with the selected tour-product information is also shown in FIG. 26. Note that the catalog data correlated with each page data is not restricted to singular catalog data, in some case, a multiple different catalog data is correlated with page data.

Moreover, while correlated page data for three pages is displayed in FIG. 26, the other correlated page data can be displayed on the tour-product information screen 2001 by selecting a previous page button 2007 or a next page button 2008 so as to switch the display.

The real image data of the corresponding page data can be displayed by selecting the thumbnail image of each page data. A selection checkbox 2005 is checked in the event of outputting the page data correlated with the selected tour-product information. In the event that desired page data exists, the desired page data can be changed in a selected status by turning this checkbox on. With regard to the page to which a mandatory attribute is set, as described above, the PC server turns the selected status on, and accordingly, the checkbox is always on, so the checkbox cannot be set to off.

With regard to the page data according to the same keyword as the group information, the checkbox may be switched on/off, the setting as to the corresponding page data is reflected to all of the page data according to the same keyword as the group information.

Upon an output confirmation button 2006 being selected, a tour-product information file output screen 2101 (shown in FIG. 27 and described later) is displayed, where the user can output the selected tour-product information and the desired page data in a desired file format.

Next, in response to the instructions, the PC server acquires the specified tour-product information from the database (Step S2710), further edits the tour-product information acquired from the database based on the setting of the page data and the output file format specified on the tour-product information file output screen 2101 by the user so as to generate customized catalog, and sends the customized catalog to the client PC 101 (Step S2711).

Now, the page data of which the printout attribute is "mandatory" is set so as to constantly become a selected status in the PC server, so the customized catalog generated by the PC server includes not only the tour-product information specified by the user but also the page data of which the printout attribute is "mandatory".

Furthermore, the page data of which the assigned block information stores the same keyword as the group information is set so as to be output as a group in the PC server, and accordingly, the customized catalog generated by the PC server includes not only the tour-product information specified by the user, and the page data of which the printout attribute is "mandatory" but also the page data according to the same keyword as the group information.

Figure 27:
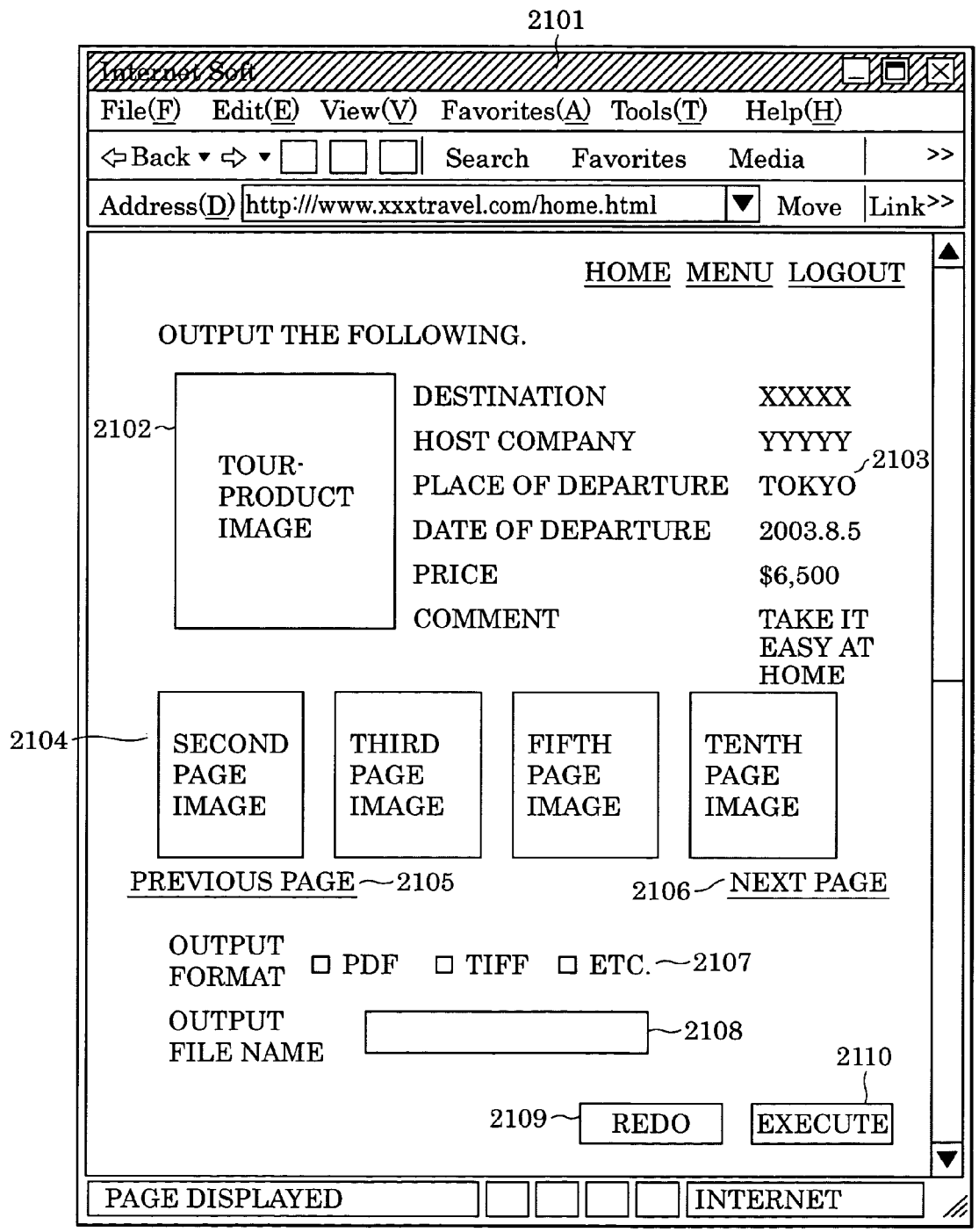

The user acquires the specified tour-product information, mandatory information such as the terms of agreement, and the other information correlated with the specified tour-product information by means of the customized catalog (Step S2712). With the client PC which can output a tour pamphlet made up of multiple tour information contents by communicating with the PC server (central information processing device), upon specification conditions for specifying the tour information contents being input through the buttons in FIGS. 24 and 25, and the checkbox 2005 in FIG. 26, the client PC 101 or the like receives and outputs tour pamphlet data made up of first tour information contents corresponding to the input specification conditions, and second tour information contents (terms of agreement contents) not corresponding to the input specification conditions. At the time of output, the instructions of an output file format 2107 in FIG. 27 are sent from the client PC 101 to the PC server, and output data according to the instructions of the output file format 2107 is sent from the PC server to the client PC 101. At the client PC 101, output (printout or PDF file output) based on the received data from the PC server is performed through output means.

FIG. 27 shows an example of a tour-product information file output screen 2101 for outputting a file such as the selected tour-product information and the like. The tour-product information file output screen 2101 includes the thumbnail image 2102 of the selected tour-product information, detailed tour-product information 2103, and the thumbnail images 2104 of the desired page data to be output selected on the tour-product information screen 2001.

In FIG. 27, the second, third, fifth, and tenth page in the group of correlated page data are selected to be output. While the page data for four pages is displayed, in the event that page data more than four pages is desired, the other desired page data can be displayed on the tour-product information file output screen 2101 by selecting a previous page button 2105 or a next page button 2106 so as to switch the display. The user can select the type of a file to be output via an output format selection 2107. While a PDF file and a TIFF file are displayed as a selectable file format in FIG. 27, the file format is not restricted to these; rather, any other file format may be employed.

The user inputs the name of an output file in an output file name box 2108. Upon a redo button 2109 being selected, the display returns to the tour-product information screen 2001. Upon an output execution button 2110 being selected, file output is performed according to the selected page data to be output, and the format of the file to which the tour-product information is set.

Note that with regard to the processing performed by the PC server in FIGS. 6, 7, and 23, an arrangement may be made wherein the PC server sends the modules for executing the above-described processing to the client PC 101 or the like, and the client PC 101 or the like executes the corresponding processing by means of the sent modules.

As described above, according to the present invention, when the specification conditions for specifying tour information contents are input, the first tour information contents corresponding to the input specification conditions, and the second tour information contents not corresponding to the input specification conditions are searched, such that the user can obtain the desired information without losing ease-of-use.

According to the present invention as described above, the user can acquire, as the customized catalog, the tour-product information corresponding to the input keyword, the information correlated with the tour-product information, and the information mandatory for the user such as terms of agreement though not correlated with the keyword, so the user does not need to input many unnecessary keywords, and the user can obtain a pamphlet made up of the desired information and the mandatory information. Other documents that do not include the keyword input by the user but are correlated with the document including the input keyword, and documents mandatory for user presentation regardless of the keyword, are sent to the user side information processing device in order to obtain a sufficient output as a tour pamphlet including the information desired by the user.

The present invention can be realized by an arrangement wherein the recording medium storing the program code of the software for realizing the functions of the above-described embodiment is applied to the system or a device making up the system, and the computer (or CPU or microprocessing unit (MPU)) of the system or the device reads out and executes the program code stored in the recording medium.

In this case, the program code itself read out from the recording medium realizes the functions of the above-described embodiment. Examples of the recording medium supplying the program code include, for example, a floppy disk, hard disk, optical disk, magneto-optical disk, compact disk-read only memory (CD-ROM), compact disk-recordable (CD-R), compact disk-rewritable (CD-RW), digital versatile disk-read only memory (DVD-ROM), digital versatile disk-random access memory (DVD-RAM), digital versatile disk-rewritable (DVD-RW), magnetic tape, nonvolatile memory cards, read-only memory (ROM), downloading via the Internet, and so forth. It is needless to say that the present invention includes not only the arrangements wherein the functions of the above-described embodiment are realized by the computer executing the program code read out, but also arrangements wherein the functions of the above-described embodiment are realized by the processing wherein the operating system or the like running on the computer executes a part or all of the actual processing based on the instructions of the program code.

Furthermore, the present invention includes arrangements wherein the program code read out from the recording medium is written into memory equipped with a function expansion unit connected to the computer or the function expansion board inserted in the computer, following which the CPU or the like equipped with the expansion board or expansion unit executes a part or all of the actual processing based on the instructions of the program code, and the functions of the above-described embodiment are realized by the processing.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing device for communicating with a central information processing device having a database storing a plurality of contents and an output table storing an output flag for selectively controlling display of the content, and outputting a pamphlet including the plurality of contents, the information processing device comprising:
   an input device configured to input a specification condition for specifying content;
   a display device configured to display, based on a value of the output control flag, a page selection screen for selecting pages for editing the pamphlet, the page selection screen including both a thumbnail image of a page extracted from the database by the central information processing device, in which first content satisfying the specification condition is described, and a thumbnail image of a page, in which second content about terms of agreement independent of the specification condition is described, wherein the thumbnail image of the page, in which the second content is described, is always selected on the page selection screen;
   a receiver configured to receive, from the central information processing device, the pamphlet including both the page extracted from the database and selected via the page selection screen and the page in which the second content is described; and
   an output device configured to output the pamphlet received by the receiver.

2. An information output program that can be executed by a computer in an information processing device for communicating with a central information processing device having a database storing a plurality of tour information contents and an output table storing an output flag for selectively controlling display of the content, and outputting a tour pamphlet made up of the plurality of tour information contents, the information output program comprising:
   an input module for obtaining input specification conditions for specifying tour information contents;
   a display module for displaying, based on a value of the output control flag, a page selection screen for selecting pages for editing the pamphlet, the page selection screen including both a thumbnail image of a page extracted from the database by the central information processing device, in which first content satisfying the specification conditions is described, and a thumbnail image of a page, in which second content about terms of agreement independent of the specification conditions is described, wherein the thumbnail image of the page, in which the second content is described, is always selected on the page selection screen; and
an output module for receiving, from the central information processing device, and outputting the tour pamphlet including both the page extracted from the database and selected via the selection screen and the page in which the second content is described.

3. An information output method performed by an information processing device for communicating with a central information processing device having a database storing a plurality of tour information contents and an output table storing an output flag for selectively controlling display of the content, and outputting a tour pamphlet made up of the plurality of tour information contents, the information output method comprising:
obtaining, via an input device, input specification conditions for specifying tour information contents;
displaying, based on a value of the output control flag, a page selection screen for selecting pages for editing the pamphlet, the page selection screen including both a thumbnail image of a page extracted from the database by the central information processing device, in which first content satisfying the specification conditions is described, and a thumbnail image of a page, in which second content about terms of agreement independent of the specification conditions is described, wherein the thumbnail image of the page, in which the second content is described, is always selected on the page selection screen;
receiving, from the central information processing device, the tour pamphlet including both the page extracted from the database and selected via the page selection screen and the page in which the second content is described; and
outputting the tour pamphlet.

4. An information output method according to claim 3, wherein the second tour information contents includes tour information contents correlated with the first tour information contents.

5. An information output method according to claim 3, further comprising registering, in the central information processing device, the tour information contents to which an attribute to be used for a search corresponding to the input specification conditions is added.

6. An information output method according to claim 3, further comprising adding an attribute to the tour information contents corresponding to at least one of a catalog and a tour-product.

7. An information output method according to claim 6, wherein the at least one of the catalog and the tour product comprises a plurality of pages and the attribute includes an image attribute corresponding to each of the plurality of pages of the at least one of the catalog and the tour-product.

8. An information output method according to claim 7, further comprising reducing the image attribute made up of the plurality of pages into one page.

9. An information output method according to claim 7, further comprising grouping the plurality of pages.

10. An information output method according to claim 6, wherein the attribute includes an individual attribute for each of the tour-products and a common attribute common to a plurality of the tour-products.

11. An information output method according to claim 10, wherein the individual attribute is tour course information.

12. An information output method according to claim 10, wherein the common attribute is tour options information.

13. An information output method according to claim 6, further comprising setting a disclosure/nondisclosure status of the catalog.

14. An information output method according to claim 6, further comprising setting a catalog processing method to be applied to the catalog at a time of registering the catalog.

15. An information output method according to claim 6, further comprising registering the plurality of catalogs in block.

16. An information output method according to claim 6, wherein the attribute includes an output attribute for controlling output of the tour information contents.

17. An information output method according to claim 16, wherein the output attribute includes an individual output attribute for each of the tour-products and a common output attribute common to a plurality of the tour-products.

18. A central information processing device for communicating with an information processing device for outputting a pamphlet including a plurality of contents, the central information processing device comprising:
a database storing the plurality of contents and an output control table storing an output flag for selectively controlling display of the contents;
an extract device configured to receive an input specification condition for specifying content, extract a page including first content satisfying the specification condition, and extract a page including second content including terms of agreement independent of the specification condition; and
a generation device configured to generate based on a value of the output control flag, a page selection screen for selecting pages for editing the pamphlet, the page selection screen including both a thumbnail image of a page, in which the first tour information contents is described, and a thumbnail image of a page, in which the second tour information contents is described, wherein the thumbnail image of the page, in which the second tour information contents is described, is always selected on the page selection screen, and to make the pamphlet based on a users selection via the page selection screen.

19. An information output program configured to be executed by a computer in a central information processing device for communicating with an information processing device for outputting a tour pamphlet made up of a plurality of tour information contents, the information output program comprising:
a database storing the plurality of tour information contents and an output control table storing an output flag for selectively controlling display of the contents;
a search module for receiving input specification conditions and searching for first tour information contents satisfying the input specification conditions and second tour information including terms of agreement independent of the input specification conditions; and
a generation module for generating, based on a value of the output control flag, a page selection screen for selecting pages for editing the pamphlet, the page selection screen including both a thumbnail image of a page, in which the first tour information contents is described, and a thumbnail image of a page, in which the second tour information contents is described, wherein the thumbnail image of the page, in which the second tour information contents is described, is always selected on the page selection screen, and making the pamphlet based on a users selection via the page selection screen.

20. An information output method used by a central information processing device for communicating with an information processing device for outputting a tour pamphlet made up of a plurality of tour information contents for outputting information to the information processing device, the information output method comprising:

storing the plurality of tour information contents and an output control table;

storing an output flag for selectively controlling display of the contents;

receiving input specification conditions;

searching first tour information contents satisfying the input specification conditions;

searching second tour information contents including terms of agreement independent of the input specification conditions;

generating a page selection screen, based on a value of the output control flag, for selecting pages for editing the pamphlet, the page selection screen including both a thumbnail image of a page, in which the first tour information contents is described, and a thumbnail image of a page, in which the second tour information contents is described, wherein the thumbnail image of the page, in which the second tour information contents is described, is always selected on the page selection screen; and making the pamphlet based on a users selection via the page selection screen.

21. An information output method according to claim 20, wherein the second tour information contents includes tour information contents correlated with the first tour information contents.

22. An information output method according to claim 20, further comprising registering, in the central information processing device, the tour information contents to which an attribute to be used for a search corresponding to the input specification conditions is added.

23. An information output method according to claim 20, further comprising adding an attribute to the tour information contents corresponding to at least one of a catalog and a tour-product.

24. An information output method according to claim 23, wherein the at least one of the catalog and the tour-product comprises a plurality of pages and the attribute includes an image attribute corresponding to each of the plurality of pages of the at least one of the catalog and the tour-product.

25. An information output method according to claim 24, further comprising reducing the image attribute made up of the plurality of pages into one page.

26. An information output method according to claim 24, further comprising grouping the plurality of pages.

27. An information output method according to claim 23, wherein the attribute includes an individual attribute for each of the tour-products and a common attribute common to a plurality of the tour-products.

28. An information output method according to claim 27, wherein the individual attribute is tour course information.

29. An information output method according to claim 27, wherein the common attribute is tour options information.

30. An information output method according to claim 23, further comprising setting a disclosure/nondisclosure status of the catalog.

31. An information output method according to claim 23, further comprising setting a catalog processing method to be applied to the catalog at the time of registering the catalog.

32. An information output method according to claim 23, further comprising registering the plurality of catalogs in block.

33. An information output method according to claim 23, wherein the attribute includes an output attribute for controlling output of the tour information contents.

34. An information output method according to claim 33, wherein the output attribute includes an individual output attribute for each of the tour-products and a common output attribute common to a plurality of the tour-products.

* * * * *